(12) United States Patent
John Wilson et al.

(10) Patent No.: US 10,687,352 B2
(45) Date of Patent: Jun. 16, 2020

(54) MULTIPLEXING CLUSTERED CONTROL INFORMATION AND DATA

(71) Applicant: QUALCOMM Incorporated, San Diego, CA (US)

(72) Inventors: Makesh Pravin John Wilson, San Diego, CA (US); Tao Luo, San Diego, CA (US); Jing Sun, San Diego, CA (US); Heechoon Lee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 36 days.

(21) Appl. No.: 16/007,919

(22) Filed: Jun. 13, 2018

(65) Prior Publication Data

US 2018/0376501 A1 Dec. 27, 2018

Related U.S. Application Data

(60) Provisional application No. 62/524,432, filed on Jun. 23, 2017.

(51) Int. Cl.
*H04W 72/04* (2009.01)
*H04W 72/14* (2009.01)
*H04W 72/12* (2009.01)

(52) U.S. Cl.
CPC ......... *H04W 72/14* (2013.01); *H04W 72/046* (2013.01); *H04W 72/0446* (2013.01);
(Continued)

(58) Field of Classification Search
CPC ............. H04W 72/14; H04W 72/1289; H04W 72/0446; H04W 72/1273; H04W 72/046; H04W 72/1278
See application file for complete search history.

(56) References Cited

U.S. PATENT DOCUMENTS 9,698,884 B2 * 7/2017 Guey .................. H04B 7/0617
10,321,386 B2 * 6/2019 Wang .................. H04L 5/0053
(Continued)

FOREIGN PATENT DOCUMENTS

WO WO-2013022268 A2 2/2013
WO WO-2016186699 A1 * 11/2016 ........... H04L 5/0053

OTHER PUBLICATIONS

International Search Report and Written Opinion—PCT/US2018/037615—ISA/EPO—dated Oct. 2, 2018.
(Continued)

*Primary Examiner* — Lan-Huong Truong
(74) *Attorney, Agent, or Firm* — Holland & Hart LLP/Qualcomm

(57) ABSTRACT

Methods, systems, and devices are described for wireless communications. A wireless communication device may switch between a distributed and a clustered transmission scheme for control information transmissions. In some cases, the base station may indicate to a UE that a clustered control information transmission scheme will be used and may also indicate a monitoring pattern informing the UE how to identify its own control information in a control information set. For instance, a base station may indicate to the UE that a preferred beam of the UE is correlated with a symbol position of the UE's control information in the control information set. In some cases, the base station may indicate to a UE that a distributed control information transmission scheme will be used.

43 Claims, 16 Drawing Sheets

(52) U.S. Cl.
CPC ... *H04W 72/1273* (2013.01); *H04W 72/1289* (2013.01); *H04W 72/1278* (2013.01)

(56) References Cited

U.S. PATENT DOCUMENTS

| | | | | |
|---|---|---|---|---|
| 2011/0110357 A1* | 5/2011 | Chung | ............... | H04W 48/08 370/344 |
| 2013/0070703 A1* | 3/2013 | Yasukawa | ............ | H04L 5/0091 370/329 |

OTHER PUBLICATIONS

Nokia., et al., "On Resource Allocation in Frequency Domain for PDSCH and PUSCH in NR," 3GPP Draft, 3GPP TSG RAN WG1 Ad Hoc Meeting #2, Qingdao, China, Jun. 27-30, 2017, R11710989, XP051305287 Retrieved from the Internet: URL: http://www.3gpp.org/ftp/tsg_ran/WG1_RL1/TSGR1_AH/NR_AH_1706/Docs/ [retrieved on—Jun. 17, 2017].

Panasonic., "Configuration of Coreset," 3GPP Draft, 3GPP TSG RAN WG1 NR Ad-Hoc #2, Qingdao, P.R. China, Jun. 27-30, 2017, R1-1711329, XP051304458 Retrieved from the Internet: URL: http://www.3gpp.org/ftp/tsg_ran/WG1_RL1/TSGR1_AH/NR_AH_1706/Docs/ [retrieved on—Jun. 16, 2017].].

* cited by examiner

MULTIPLEXING CLUSTERED CONTROL INFORMATION AND DATA

CROSS REFERENCES

The present application for patent claims priority to U.S. Provisional Patent Application No. 62/524,432 by John Wilson, et al., entitled "Multiplexing Clustered Control Information and Data," filed Jun. 23, 2017, assigned to the assignee hereof.

BACKGROUND

The following relates generally to wireless communication, and more specifically to multiplexing clustered control information and data.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE).

To transmit data to a UE, a wireless communications system may use control information to grant resources to the UE for data transmissions. In some cases, control information and user data may be transmitted in a same transmission time interval (TTI) with control information included in the beginning symbols of the TTI. In some examples, it may be desirable to transmit the control information over a narrowband while transmitting the user data over a wideband. However, to transmit control information over a narrowband and to transmit data over a wideband in a same slot, a base station may introduce a transmission gap between the two transmissions to provide the UE with time to retune a receiver from a narrowband mode to a wideband mode. This transmission gap may introduce latency into the system and reduce throughput.

SUMMARY

A wireless communication device may switch between a clustered and distributed transmission scheme for control information and data transmissions in a manner that improves throughput and reduces latency. In some cases, the base station may indicate to a UE that a clustered control information transmission scheme will be used and a monitoring pattern to indicate which control information set carries information for the UE. A base station using a clustered transmission scheme may transmit consecutive control information resource sets (a "control information transmission cluster") that schedule subsequent downlink data transmissions that also may be clustered. In some cases, the base station may indicate to a UE that a distributed control information transmission scheme will be used. A base station using a distributed transmission scheme may transmit interleaved control information and downlink data transmissions. Beneficially, a base station and a UE may apply the techniques described herein when scheduling control and data transmissions in a manner that improves throughput and reduces latency.

A method of wireless communications at a base station is described. The method may include transmitting an indication of which of a clustered scheme or a distributed scheme is configured for control information transmissions, transmitting, during first time resources, first control information scheduling a first data transmission during second time resources, the first time resources being selected based on the indication, transmitting, during third time resources, second control information scheduling a second data transmission during fourth time resources, the third time resources being selected based on the indication, transmitting the first data transmission during the second time resources, and transmitting the second data transmission during the fourth time resources.

An apparatus for wireless communications at a base station is described. The apparatus may include a processor, memory in electronic communication with the processor, and instructions stored in the memory. The instructions may be executable by the processor to cause the apparatus to transmit an indication of which of a clustered scheme or a distributed scheme is configured for control information transmissions, transmit, during first time resources, first control information scheduling a first data transmission during second time resources, the first time resources being selected based on the indication, transmit, during third time resources, second control information scheduling a second data transmission during fourth time resources, the third time resources being selected based on the indication, transmit the first data transmission during the second time resources, and transmit the second data transmission during the fourth time resources.

Another apparatus for wireless communications at a base station is described. The apparatus may include means for transmitting an indication of which of a clustered scheme or a distributed scheme is configured for control information transmissions, transmitting, during first time resources, first control information scheduling a first data transmission during second time resources, the first time resources being selected based on the indication, transmitting, during third time resources, second control information scheduling a second data transmission during fourth time resources, the third time resources being selected based on the indication, transmitting the first data transmission during the second time resources, and transmitting the second data transmission during the fourth time resources.

A non-transitory computer-readable medium storing code for wireless communications at a base station is described. The code may include instructions executable by a processor to transmit an indication of which of a clustered scheme or a distributed scheme is configured for control information transmissions, transmit, during first time resources, first control information scheduling a first data transmission during second time resources, the first time resources being selected based on the indication, transmit, during third time resources, second control information scheduling a second data transmission during fourth time resources, the third time resources being selected based on the indication, transmit the first data transmission during the second time resources, and transmit the second data transmission during the fourth time resources.

In some examples of the method, apparatuses, and non-transitory computer-readable medium described herein, the indication indicates that the clustered scheme may be configured for control information transmissions, and where the first control information and the second control information may be transmitted in a control information transmission cluster.

In some examples of the method, apparatuses, and non-transitory computer-readable medium described herein, the first control information may be transmitted in a first beam direction and the second control information may be transmitted in a second beam direction.

Some examples of the method, apparatuses, and non-transitory computer-readable medium described herein may further include operations, features, means, or instructions for transmitting a mapping pattern between a beam pattern corresponding to a synchronization signal transmission and a control information beam pattern of the control information transmission cluster.

Some examples of the method, apparatuses, and non-transitory computer-readable medium described herein may further include operations, features, means, or instructions for indicating a monitoring pattern for the control information transmission cluster.

In some examples of the method, apparatuses, and non-transitory computer-readable medium described herein, the second time resources and the fourth time resources occur after the first time resources and the third time resources.

In some examples of the method, apparatuses, and non-transitory computer-readable medium described herein, the second time resources occur after the first time resources, where the third time resources occur after the second time resources, and where the fourth time resources occur after the third time resources.

In some examples of the method, apparatuses, and non-transitory computer-readable medium described herein, the indication indicates that the distributed scheme may be configured for control information transmissions.

In some examples of the method, apparatuses, and non-transitory computer-readable medium described herein, the indication may be transmitted in a master information block (MIB).

In some examples of the method, apparatuses, and non-transitory computer-readable medium described herein, the first control information may be transmitted over a first frequency bandwidth, where the first data transmission may be transmitted over a second frequency bandwidth, where the second control information may be transmitted over a third frequency bandwidth, and where the second data transmission may be transmitted over a fourth frequency bandwidth.

In some examples of the method, apparatuses, and non-transitory computer-readable medium described herein, the first frequency bandwidth may be smaller than the second frequency bandwidth, and where the third frequency bandwidth may be smaller than the fourth frequency bandwidth.

In some examples of the method, apparatuses, and non-transitory computer-readable medium described herein, the first frequency bandwidth may be a same size as the second frequency bandwidth, and where the third frequency bandwidth may be a same size as the fourth frequency bandwidth.

In some examples of the method, apparatuses, and non-transitory computer-readable medium described herein, the first frequency bandwidth may be non-overlapping in frequency with the second frequency bandwidth, and where the third frequency bandwidth may be non-overlapping with the fourth frequency bandwidth.

In some examples of the method, apparatuses, and non-transitory computer-readable medium described herein, the first data transmission or the second data transmission includes a SIB message, a random access response message, a paging message, or a user data block.

A method of wireless communications at a UE is described. The method may include receiving, from a base station, an indication of which of a clustered scheme or a distributed scheme is configured for control information transmissions, monitoring, based on the indication, a control information resource set for control information for the UE, identifying, during first time resources based on the monitoring, the control information for the UE, the control information scheduling a data transmission for the UE during second time resources, and receiving the data transmission during the second time resources.

An apparatus for wireless communications at a UE is described. The apparatus may include a processor, memory in electronic communication with the processor, and instructions stored in the memory. The instructions may be executable by the processor to cause the apparatus to receive, from a base station, an indication of which of a clustered scheme or a distributed scheme is configured for control information transmissions, monitor, based on the indication, a control information resource set for control information for the UE, identify, during first time resources based on the monitoring, the control information for the UE, the control information scheduling a data transmission for the UE during second time resources, and receive the data transmission during the second time resources.

Another apparatus for wireless communications at a UE is described. The apparatus may include means for receiving, from a base station, an indication of which of a clustered scheme or a distributed scheme is configured for control information transmissions, monitoring, based on the indication, a control information resource set for control information for the UE, identifying, during first time resources based on the monitoring, the control information for the UE, the control information scheduling a data transmission for the UE during second time resources, and receiving the data transmission during the second time resources.

A non-transitory computer-readable medium storing code for wireless communications at a UE is described. The code may include instructions executable by a processor to receive, from a base station, an indication of which of a clustered scheme or a distributed scheme is configured for control information transmissions, monitor, based on the indication, a control information resource set for control information for the UE, identify, during first time resources based on the monitoring, the control information for the UE, the control information scheduling a data transmission for the UE during second time resources, and receive the data transmission during the second time resources.

In some examples of the method, apparatuses, and non-transitory computer-readable medium described herein, the indication indicates that the clustered scheme may be configured for control information transmissions, where the first time resources occur during a control information transmission cluster, and where the control information transmission cluster occurs before the second time resources.

Some examples of the method, apparatuses, and non-transitory computer-readable medium described herein may further include operations, features, means, or instructions for receiving, from the base station, an indication of a monitoring pattern for the control information transmission cluster.

Some examples of the method, apparatuses, and non-transitory computer-readable medium described herein may further include operations, features, means, or instructions for identifying a preferred transmit beam direction based on one or more synchronization signals transmitted by the base station, where a location of the control information resource set in the control information transmission cluster corresponds to the preferred transmit beam direction.

Some examples of the method, apparatuses, and non-transitory computer-readable medium described herein may further include operations, features, means, or instructions for receiving a mapping pattern between a beam pattern corresponding to a synchronization signal transmission and a control information beam pattern of the control information transmission cluster and identifying the first time resources based on the beam pattern and the mapping pattern.

In some examples of the method, apparatuses, and non-transitory computer-readable medium described herein, the indication indicates that the distributed scheme may be configured for control information transmissions.

In some examples of the method, apparatuses, and non-transitory computer-readable medium described herein, the indication may be received in a master information block (MIB), a SIB, RRC signaling, a medium access control (MAC) control element (CE), or DCI.

In some examples of the method, apparatuses, and non-transitory computer-readable medium described herein, the control information may be received over a first frequency bandwidth, and where the data transmission may be received over a second frequency bandwidth.

In some examples of the method, apparatuses, and non-transitory computer-readable medium described herein, the first frequency bandwidth may be smaller than the second frequency bandwidth.

In some examples of the method, apparatuses, and non-transitory computer-readable medium described herein, the first frequency bandwidth may be a same size as the second frequency bandwidth.

In some examples of the method, apparatuses, and non-transitory computer-readable medium described herein, the first frequency bandwidth overlaps in frequency with the second frequency bandwidth.

In some examples of the method, apparatuses, and non-transitory computer-readable medium described herein, the data transmission includes a SIB message, a random access response message, a paging message, or a user data block.

A method of wireless communication is described. The method may include identifying, for a first user equipment (UE) served by the base station, a first delay associated with retuning a receive bandwidth of a receiver of the first UE, identifying, for a second UE served by the base station, a second delay associated with retuning a receive bandwidth of a receiver of the second UE, transmitting, during first time resources over a first frequency bandwidth, a first downlink grant that schedules a first data transmission for the first UE during second time resources over a second frequency bandwidth, the second time resources being selected based at least in part on the first time resources and the first delay, transmitting, during third time resources over a third frequency bandwidth, a second downlink grant that schedules a second data transmission for the second UE during fourth time resources over a fourth frequency bandwidth, the fourth time resources being selected based at least in part on the third time resources and the second delay, transmitting the first data transmission during the second time resources over the second frequency bandwidth, and transmitting the second data transmission during the fourth time resources over the second frequency bandwidth.

An apparatus for wireless communication is described. The apparatus may include means for identifying, for a first user equipment (UE) served by the base station, a first delay associated with retuning a receive bandwidth of a receiver of the first UE, means for identifying, for a second UE served by the base station, a second delay associated with retuning a receive bandwidth of a receiver of the second UE, means for transmitting, during first time resources over a first frequency bandwidth, a first downlink grant that schedules a first data transmission for the first UE during second time resources over a second frequency bandwidth, the second time resources being selected based at least in part on the first time resources and the first delay, means for transmitting, during third time resources over a third frequency bandwidth, a second downlink grant that schedules a second data transmission for the second UE during fourth time resources over a fourth frequency bandwidth, the fourth time resources being selected based at least in part on the third time resources and the second delay, means for transmitting the first data transmission during the second time resources over the second frequency bandwidth, and means for transmitting the second data transmission during the fourth time resources over the second frequency bandwidth.

Another apparatus for wireless communication is described. The apparatus may include a processor, memory in electronic communication with the processor, and instructions stored in the memory. The instructions may be operable to cause the processor to identify, for a first user equipment (UE) served by the base station, a first delay associated with retuning a receive bandwidth of a receiver of the first UE, identify, for a second UE served by the base station, a second delay associated with retuning a receive bandwidth of a receiver of the second UE, transmit, during first time resources over a first frequency bandwidth, a first downlink grant that schedules a first data transmission for the first UE during second time resources over a second frequency bandwidth, the second time resources being selected based at least in part on the first time resources and the first delay, transmit, during third time resources over a third frequency bandwidth, a second downlink grant that schedules a second data transmission for the second UE during fourth time resources over a fourth frequency bandwidth, the fourth time resources being selected based at least in part on the third time resources and the second delay, transmit the first data transmission during the second time resources over the second frequency bandwidth, and transmit the second data transmission during the fourth time resources over the second frequency bandwidth.

A non-transitory computer readable medium for wireless communication is described. The non-transitory computer-readable medium may include instructions operable to cause a processor to identify, for a first user equipment (UE) served by the base station, a first delay associated with retuning a receive bandwidth of a receiver of the first UE, identify, for a second UE served by the base station, a second delay associated with retuning a receive bandwidth of a receiver of the second UE, transmit, during first time resources over a first frequency bandwidth, a first downlink grant that schedules a first data transmission for the first UE during second time resources over a second frequency bandwidth, the second time resources being selected based at least in part on the first time resources and the first delay, transmit, during third time resources over a third frequency bandwidth, a second downlink grant that schedules a second data transmission for the second UE during fourth time resources over a fourth frequency bandwidth, the fourth time resources being selected based at least in part on the third time resources and the second delay, transmit the first data transmission during the second time resources over the second frequency bandwidth, and transmit the second data transmission during the fourth time resources over the second frequency bandwidth.

In some examples of the method, apparatus, and non-transitory computer-readable medium described above, the first downlink grant may be transmitted in a first beam direction and the second downlink grant may be transmitted in a second beam direction.

Some examples of the method, apparatus, and non-transitory computer-readable medium described above may further include processes, features, means, or instructions for transmitting an indication that control information transmissions may be configured in a control information transmission cluster.

Some examples of the method, apparatus, and non-transitory computer-readable medium described above may further include processes, features, means, or instructions for transmitting a mapping pattern between a beam pattern corresponding to synchronization signal or reference signal transmissions and a control information beam pattern of the control information transmission cluster.

Some examples of the method, apparatus, and non-transitory computer-readable medium described above may further include processes, features, means, or instructions for indicating a monitoring pattern for the control information transmission cluster to the first UE or the second UE.

Some examples of the method, apparatus, and non-transitory computer-readable medium described above may further include processes, features, means, or instructions for receiving, from the first UE, a first indication of the first delay. Some examples of the method, apparatus, and non-transitory computer-readable medium described above may further include processes, features, means, or instructions for receiving, from the second UE, a second indication of the second delay.

Some examples of the method, apparatus, and non-transitory computer-readable medium described above may further include processes, features, means, or instructions for determining that the first delay may be longer than the second delay. Some examples of the method, apparatus, and non-transitory computer-readable medium described above may further include processes, features, means, or instructions for scheduling the transmission of the first downlink grant before the transmission of the second downlink grant based at least in part on the determination.

In some examples of the method, apparatus, and non-transitory computer-readable medium described above, the second time resources may be after the first time resources and the fourth time resources may be prior to the third time resources.

In some examples of the method, apparatus, and non-transitory computer-readable medium described above, the first frequency bandwidth may be smaller than the second frequency bandwidth.

In some examples of the method, apparatus, and non-transitory computer-readable medium described above, the first frequency bandwidth overlaps in frequency with the second frequency bandwidth.

In some examples of the method, apparatus, and non-transitory computer-readable medium described above, the first frequency bandwidth may be non-overlapping in frequency with the second frequency bandwidth.

In some examples of the method, apparatus, and non-transitory computer-readable medium described above, the first frequency bandwidth and the third frequency bandwidth may be the same.

In some examples of the method, apparatus, and non-transitory computer-readable medium described above, the first frequency bandwidth and the third frequency bandwidth may be different.

In some examples of the method, apparatus, and non-transitory computer-readable medium described above, the second frequency bandwidth and the fourth frequency bandwidth may be the same.

In some examples of the method, apparatus, and non-transitory computer-readable medium described above, the second frequency bandwidth and the fourth frequency bandwidth may be different.

In some examples of the method, apparatus, and non-transitory computer-readable medium described above, the first data transmission or the second data transmission comprises a system information block (SIB) message, a random access response message, a paging message, or a user data block.

A method of wireless communication is described. The method may include receiving, from a base station, an indication that control information for the UE is configured in a control information transmission cluster, receiving, from the base station, an indication of a control information resource set, the control information resource set associated with a first frequency bandwidth, monitoring the control information resource set for the control information for the UE for at least a portion of the control information transmission cluster, identifying, during first time resources based on the monitoring, a downlink grant for the UE, the downlink grant scheduling a data transmission for the first UE during second time resources over a second frequency bandwidth, and receiving the data transmission in the second time resources over the second frequency bandwidth based at least in part on the downlink grant.

An apparatus for wireless communication is described. The apparatus may include means for receiving, from a base station, an indication that control information for the UE is configured in a control information transmission cluster, means for receiving, from the base station, an indication of a control information resource set, the control information resource set associated with a first frequency bandwidth, means for monitoring the control information resource set for the control information for the UE for at least a portion of the control information transmission cluster, means for identifying, during first time resources based on the monitoring, a downlink grant for the UE, the downlink grant scheduling a data transmission for the first UE during second time resources over a second frequency bandwidth, and means for receiving the data transmission in the second time resources over the second frequency bandwidth based at least in part on the downlink grant.

Another apparatus for wireless communication is described. The apparatus may include a processor, memory in electronic communication with the processor, and instructions stored in the memory. The instructions may be operable to cause the processor to receive, from a base station, an indication that control information for the UE is configured in a control information transmission cluster, receive, from the base station, an indication of a control information resource set, the control information resource set associated with a first frequency bandwidth, monitor the control information resource set for the control information for the UE for at least a portion of the control information transmission cluster, identify, during first time resources based on the monitoring, a downlink grant for the UE, the downlink grant scheduling a data transmission for the first UE during second time resources over a second frequency bandwidth, and receive the data transmission in the second time resources over the second frequency bandwidth based at least in part on the downlink grant.

A non-transitory computer readable medium for wireless communication is described. The non-transitory computer-readable medium may include instructions operable to cause a processor to receive, from a base station, an indication that control information for the UE is configured in a control information transmission cluster, receive, from the base station, an indication of a control information resource set, the control information resource set associated with a first frequency bandwidth, monitor the control information resource set for the control information for the UE for at least a portion of the control information transmission cluster, identify, during first time resources based on the monitoring, a downlink grant for the UE, the downlink grant scheduling a data transmission for the first UE during second time resources over a second frequency bandwidth, and receive the data transmission in the second time resources over the second frequency bandwidth based at least in part on the downlink grant.

Some examples of the method, apparatus, and non-transitory computer-readable medium described above may further include processes, features, means, or instructions for receiving the downlink grant over the first frequency bandwidth. Some examples of the method, apparatus, and non-transitory computer-readable medium described above may further include processes, features, means, or instructions for retuning a receiver of the UE based at least in part on the scheduling. Some examples of the method, apparatus, and non-transitory computer-readable medium described above may further include processes, features, means, or instructions for receiving the data transmission over the second frequency bandwidth based at least in part on retuning the receiver.

Some examples of the method, apparatus, and non-transitory computer-readable medium described above may further include processes, features, means, or instructions for indicating, to the base station, a delay associated with the retuning of the receiver.

Some examples of the method, apparatus, and non-transitory computer-readable medium described above may further include processes, features, means, or instructions for receiving, from the base station, an indication of a monitoring pattern for the UE for the control information transmission cluster, wherein the monitoring comprises monitoring the control information resource set according to the monitoring pattern.

Some examples of the method, apparatus, and non-transitory computer-readable medium described above may further include processes, features, means, or instructions for identifying a preferred transmit beam direction of the base station based on one or more synchronization signals or one or more reference signals transmitted by the base station, wherein the portion of the control information transmission cluster corresponds to control information transmitted using the preferred transmit beam direction.

Some examples of the method, apparatus, and non-transitory computer-readable medium described above may further include processes, features, means, or instructions for receiving a mapping pattern between a beam pattern of the one or more synchronization signals or the one or more reference signals and a control information beam pattern of the control information transmission cluster. Some examples of the method, apparatus, and non-transitory computer-readable medium described above may further include processes, features, means, or instructions for identifying the portion of the control information transmission cluster based at least in part on the beam pattern and the mapping pattern.

Some examples of the method, apparatus, and non-transitory computer-readable medium described above may further include processes, features, means, or instructions for receiving the indication that control information for the UE may be configured in a control information transmission cluster comprises receiving the indication in a master information block (MIB), a system information block (SIB), radio resource control (RRC) signaling, a medium access control (MAC) control element (CE), or downlink control information (DCI).

In some examples of the method, apparatus, and non-transitory computer-readable medium described above, the first frequency bandwidth may be smaller than the second frequency bandwidth.

In some examples of the method, apparatus, and non-transitory computer-readable medium described above, the first frequency bandwidth overlaps in frequency with the second frequency bandwidth.

In some examples of the method, apparatus, and non-transitory computer-readable medium described above, the first frequency bandwidth may be non-overlapping in frequency with the second frequency bandwidth.

In some examples of the method, apparatus, and non-transitory computer-readable medium described above, the data transmission comprises a system information block (SIB) message, a random access response message, a paging message, or a user data block.

DETAILED DESCRIPTION

Figure 1:
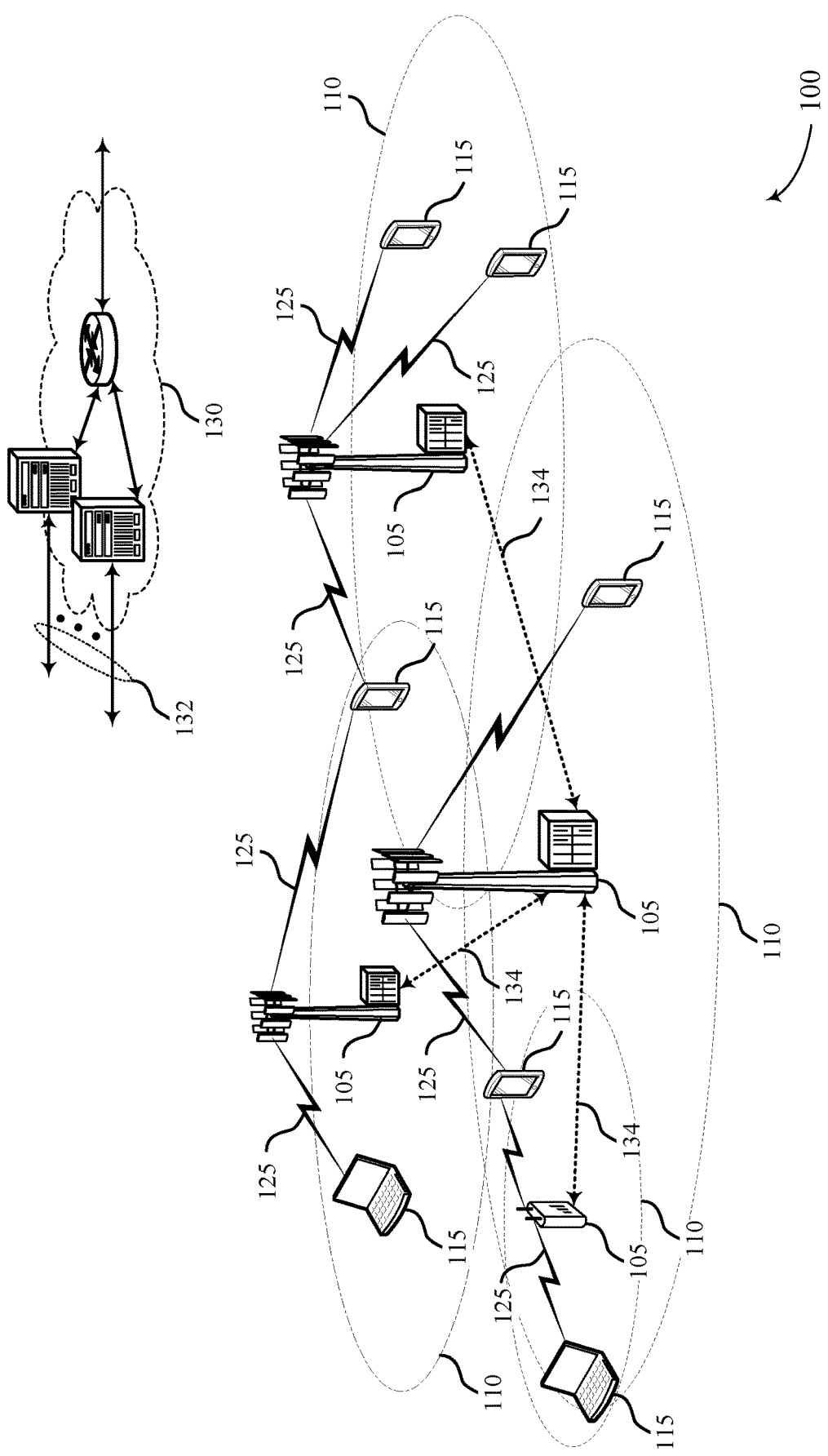
FIG. 1 illustrates an example of a wireless communications system that supports multiplexing clustered control information and data in accordance with various aspects of the present disclosure.

A wireless communication device may switch between a clustered and distributed transmission scheme for control information and data transmissions. A base station using a clustered transmission scheme may transmit consecutive control information resource sets (a "control information transmission cluster") that schedule subsequent downlink data transmissions that also may be clustered. A base station using a distributed transmission scheme may transmit interleaved control information and downlink data transmissions. That is, the base station may transmit first control information and a corresponding first data transmission, then second control information and a corresponding second data transmission, and so on. A base station may indicate whether a clustered or distributed transmission scheme to a UE prior to control and data transmissions. Beneficially, the techniques described herein may improve scheduling of control and data transmissions that improves throughout and reduces latency.

In some examples, a base station may indicate to a UE a control information resource set that carries information for the UE. For instance, when employing a clustered transmission scheme, a base station may indicate a monitoring pattern that indicates to a UE which control information resource set in a control information transmission cluster carries information for the UE. In some examples, a base station may indicate to the UE that a preferred beam of the UE is correlated with a symbol position of the UE's control information in the control information set.

In some examples, a wireless communication device may schedule narrowband control information transmissions in clusters to increase throughput and reduce latency. For example, a base station may transmit control information for multiple UEs in a control information transmission cluster and may transmit data for the multiple UEs in a subsequent data transmission cluster, where the data for the multiple UEs is scheduled by the control information. In some cases, the control information is transmitted over different sets of frequencies than the corresponding data transmissions, and the corresponding data transmissions observe a retuning delay after the control information transmission to allow the multiple UEs to retune to receive the corresponding data transmissions on the different set of frequencies. Control information for additional UEs may be scheduled on resources within the retuning delay after the control information is scheduled for a given UE. Different control resources may be associated with different transmit beams.

In one example, a base station indicates to associated UEs that the base station will use a control information transmission cluster scheme for certain transmissions (e.g., system information, RACH signaling, paging, downlink or uplink grants, and the like). The base station may then schedule control information for multiple UEs in a control information transmission cluster. The control information cluster may include multiple control channel resource sets for multiple UEs. In some cases, the length of the control information transmission cluster is based at least in part on a retuning delay (e.g., an average retuning delay, a worst case retuning delay, or retuning delays explicitly indicated by the multiple UEs) or a number of beams supported for control information. The control information in the control information transmission cluster may be used to schedule later data transmissions for the multiple UEs (e.g., in a data transmission cluster). In some cases, a first control channel resource set carrying control information for a first UE may be separated by data resources for a corresponding data transmission by a period of time equivalent to the UE's retuning delay (or "a retuning delay period"). The remaining control channel resource sets for other UEs may be located in time within the period of time between the first control channel resource set and the data resources.

In some cases, signaling techniques may be employed to support a control information transmission cluster scheme. For instance, a base station may direct a UE to monitor a certain beam and/or certain symbol periods or slots in a control information transmission cluster for control information (e.g., by sending an indication of a beam or beam direction). In some examples, the indicated beam corresponds to a control channel resource set which includes one or a set of symbol periods in the control information transmission cluster. For instance, a UE that receives an indication to monitor a second beam may also monitor a second symbol period or slot in the control information transmission cluster. In other examples, a UE may identify a preferred transmit beam based on synchronization signal (SS) block transmissions or beamformed channel state information (CSI)-reference signal (CSI-RS) transmissions—and may implicitly determine that a control channel resource set carrying control information for the UE in the control information transmission cluster set begins at a symbol period corresponding to the index of the preferred transmit beam. In some cases, the control information transmission cluster signaling may be transmitted in a master information block (MIB), a system information block (SIB), radio resource control (RRC) signaling, a medium access control (MAC) control element (CE), or downlink control information (DCI).

Features of the disclosure introduced above are further described below in the context of a wireless communication system. Specific examples are then described of an example process flow for multiplexing clustered control information and data. These and other features of the disclosure are further illustrated by and described with reference to apparatus diagrams, system diagrams, and flowcharts that relate to multiplexing clustered control information and data.

FIG. 1 illustrates an example of a wireless communications system 100 that supports multiplexing clustered control information and data in accordance with various aspects of the present disclosure. The wireless communications system 100 includes base stations 105, UEs 115, and a core network 130. In some examples, the wireless communications system 100 may be a Long Term Evolution (LTE) network, LTE-Advanced (LTE-A) network, or a 5G new radio (NR) network. In some cases, wireless communications system 100 may support enhanced broadband communications, ultra-reliable (i.e., mission critical) communications, low latency communications, and communications with low-cost and low-complexity devices.

Base stations 105 may wirelessly communicate with UEs 115 via one or more base station antennas. Each base station 105 may provide communication coverage for a respective geographic coverage area 110. Communication links 125 shown in wireless communications system 100 may include uplink transmissions from a UE 115 to a base station 105, or downlink transmissions, from a base station 105 to a UE 115. Control information and data may be multiplexed on an uplink channel or downlink channel according to various techniques. Control information and data may be multiplexed on a downlink channel, for example, using time division multiplexing (TDM) techniques, frequency division multiplexing (FDM) techniques, or hybrid TDM-FDM techniques. In some examples, the control information transmitted during a transmission time interval (TTI) of a downlink channel may be distributed between different control regions in a cascaded manner (e.g., between a common control region and one or more UE-specific control regions).

UEs 115 may be dispersed throughout the wireless communications system 100, and each UE 115 may be stationary or mobile. A UE 115 may also be referred to as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may also be a cellular phone, a personal digital assistant (PDA), a wireless modem, a wireless communication device, a handheld device, a tablet computer, a laptop computer, a cordless phone, a personal electronic device, a handheld device, a personal computer, a wireless local loop (WLL) station, an Internet of things (IoT) device, an Internet of Everything (IoE) device, a machine type communication (MTC) device, an appliance, an automobile, or the like.

In some cases, a UE 115 may also be able to communicate directly with other UEs (e.g., using a peer-to-peer (P2P) or device-to-device (D2D) protocol). One or more of a group of UEs 115 utilizing D2D communications may be within the coverage area 110 of a cell. Other UEs 115 in such a group may be outside the coverage area 110 of a cell, or otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out independently of a base station 105.

Some UEs 115, such as MTC or IoT devices, may be low cost or low complexity devices, and may provide for automated communication between machines, i.e., Machine-to-Machine (M2M) communication. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105, next generation NodeBs (gNBs) 105, etc.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use Hybrid Automatic Repeat Request (HARM) to provide retransmission at the MAC layer to improve link efficiency. In the control plane, the Radio Resource Control (RRC) protocol layer may provide establishment, configuration, and maintenance of an RRC connection between a UE 115 and a base station 105, or core network 130 supporting radio bearers for user plane data. At the physical (PHY) layer, transport channels may be mapped to physical channels.

Wireless communications system 100 may support operation on multiple cells or carriers, a feature which may be referred to as carrier aggregation (CA) or multi-carrier operation. A carrier may also be referred to as a component carrier (CC), a layer, a channel, etc. The terms "carrier," "component carrier," and "channel" may be used interchangeably herein. A UE 115 may be configured with multiple downlink CCs and one or more uplink CCs for carrier aggregation. Carrier aggregation may be used with both frequency division duplex (FDD) and time division duplex (TDD) component carriers.

In some cases, wireless communications system 100 may utilize enhanced component carriers (eCCs). An eCC may be characterized by one or more features including: wider bandwidth, shorter symbol duration, shorter TTIs, and modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (where more than one operator is allowed to use the spectrum). An eCC characterized by wide bandwidth may include one or more segments that may be utilized by UEs 115 that are not capable of monitoring the whole bandwidth or prefer to use a limited bandwidth (e.g., to conserve power).

In some cases, an eCC may utilize a different symbol duration than other CCs, which may include use of a reduced symbol duration as compared with symbol durations of the other CCs. A shorter symbol duration may be associated with increased subcarrier spacing. A TTI in an eCC may consist of one or multiple symbols. In some cases, the TTI duration (that is, the number of symbols in a TTI) may be variable. In some cases, an eCC may utilize a different symbol duration than other CCs, which may include use of a reduced symbol duration as compared with symbol durations of the other CCs. A shorter symbol duration is associated with increased subcarrier spacing. A device, such as a UE 115 or base station 105, utilizing eCCs may transmit wideband signals (e.g., 20, 40, 60, 80 MHz, etc.) at reduced symbol durations (e.g., 16.67 microseconds). A TTI in eCC may consist of one or multiple symbols. In some cases, the TTI duration (that is, the number of symbols in a TTI) may be variable.

A shared radio frequency spectrum band may be utilized in an NR shared spectrum system. For example, an NR shared spectrum may utilize any combination of licensed, shared, and unlicensed spectrums, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources. When operating in unlicensed radio frequency spectrum bands, wireless devices such as base stations 105 and UEs 115 may employ listen-before-talk (LBT) procedures to ensure the channel is clear before transmitting data. In some cases, operations in unlicensed bands may be based on a CA configuration in conjunction with CCs operating in a licensed band. Operations in unlicensed spectrum may include downlink transmissions, uplink transmissions, or both. Duplexing in unlicensed spectrum may be based on FDD, TDD, or a combination of both.

Wireless communications system 100 may operate in an ultra-high frequency (UHF) region using frequency bands from 300 MHz to 3 GHz. This region may also be known as the decimeter band, since the wavelengths range from approximately one decimeter to one meter in length. UHF waves may propagate mainly by line of sight, and may be blocked by buildings and environmental features. However, the waves may penetrate walls sufficiently to provide service to UEs 115 located indoors. Transmission of UHF waves is characterized by smaller antennas and shorter range (e.g., less than 100 km) compared to transmission using the smaller frequencies (and longer waves) of the high frequency (HF) or very high frequency (VHF) portion of the spectrum. Wireless communications system 100 may also operate in a super high frequency (SHF) region using frequency bands from 3 GHz to 30 GHz, otherwise known as the centimeter band. In some cases, wireless communications system 100 may also utilize extremely high frequency (EHF) portions of the spectrum (e.g., from 30 GHz to 300 GHz), also known as the millimeter band. Systems that use this region may be referred to as millimeter wave (mmW) systems. Thus, EHF antennas may be even smaller and more closely spaced than UHF antennas. In some cases, this may facilitate use of antenna arrays within a UE 115 (e.g., for directional beamforming). However, EHF transmissions may be subject to even greater atmospheric attenuation and shorter range than UHF transmissions. Techniques disclosed herein may be employed across transmissions that use one or more different frequency regions.

Wireless communications system 100 may support millimeter wave (mmW) communications between UEs 115 and base stations 105. Devices operating in mmW, SHF, or EHF bands may have multiple antennas to allow beamforming. Beamforming may also be employed outside of these frequency bands (e.g., in any scenario in which increased cellular coverage is desired). That is, a base station 105 may use multiple antennas or antenna arrays to conduct beamforming operations for directional communications with a UE 115. Beamforming (which may also be referred to as spatial filtering or directional transmission) is a signal processing technique that may be used at a transmitter (e.g., a base station 105) to shape and/or steer an overall antenna beam in the direction of a target receiver (e.g., a UE 115). This may be achieved by combining elements in an antenna array in such a way that transmitted signals at particular angles experience constructive interference while others experience destructive interference. For example, base station 105 may have an antenna array with a number of rows and columns of antenna ports that the base station 105 may use for beamforming in its communication with UE 115. Signals may be transmitted multiple times in different directions (e.g., each transmission may be beamformed differently). A mmW receiver (e.g., a UE 115) may try multiple beams (e.g., antenna subarrays) while receiving the signals. Each of these beams may be referred to as a receive beam in aspects of the present disclosure. Such techniques (or similar techniques) may serve to increase the coverage area 110 of the base station 105 or otherwise benefit the wireless communications system 100.

Multiple-input multiple-output (MIMO) wireless systems use a transmission scheme between a transmitter (e.g., a base station 105) and a receiver (e.g., a UE 115), where both transmitter and receiver are equipped with multiple antennas. In some cases, the antennas of a base station 105 or UE 115 may be located within one or more antenna arrays, which may support beamforming or MIMO operation. One or more base station antennas or antenna arrays may be collocated at an antenna assembly, such as an antenna tower. In some cases, antennas or antenna arrays associated with a base station 105 may be located in diverse geographic locations. A base station 105 may use multiple antennas or antenna arrays to conduct beamforming operations for directional communications with a UE 115.

Wireless communications system 100 may schedule resources to support both uplink and downlink transmissions. For instance, wireless communications system 100 may allocate a first set of resources to downlink transmission and a second set of resources to uplink transmissions. If wireless communications system 100 utilizes frequency division duplexing (FDD) for communications, then uplink and downlink transmissions may occur simultaneously. That is, wireless communications system 100 may allocate a first set of frequencies to uplink transmissions and a second set of frequencies to downlink transmissions. If wireless communications system 100 utilizes time division duplexing (TDD) for communications, then uplink and downlink transmissions may not occur simultaneously. That is, wireless communications system 100 may allocate all of the frequency resources to downlink transmissions during a first interval (e.g., one or more subframes) and may allocate all of the frequency resources to uplink transmissions during a second interval (e.g., a subsequent subframe). Wireless communications system 100 may also use a combination of FDD and TDD techniques.

The resources allocated to uplink and downlink transmissions may be further partitioned into control and data resources. The resources that carry uplink transmissions of control information may be denoted as the PUCCH, while the resources that carry uplink transmissions of data may be denoted as the physical uplink shared channel (PUSCH). In some cases, a wireless communications system 100 may allocate a first set of resources in a TTI to control information (the first set of resources may be referred to as control resources, a control channel resource set, a control resource set (CORESET), a PDCCH, a PUCCH, or the like) and may allocate the remaining, subsequent resources to data transmissions (the remaining resources may be referred to as data resources, a PDSCH, a PUSCH, or the like). In other cases, the wireless communications system 100 may intersperse control and data resources in a TTI.

A UE 115 may synchronize with the wireless communications system 100 using synchronization signals or channels transmitted by a network entity (e.g., cell acquisition). In some examples, a base station 105 may transmit synchronization signal (SS) blocks containing discovery reference signals. SS blocks may include a primary synchronization signal (PSS), a secondary synchronization signal (SSS), or a physical broadcast channel (PBCH). A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value. The cell group identity value may be combined with the physical layer identifier to form the physical cell identifier (PCID), which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). For example, the PBCH may carry a master information block (MIB) and one or more system information blocks (SIBs) for a given cell.

Because a base station 105 may not know the locations of devices attempting to synchronize with a cell of the base station, SS blocks may be successively transmitted (e.g., across multiple symbol periods) in a beam swept manner. In some cases, the base station 105 transmits eight SS blocks (although in other examples, base station 105 may transmit up to 64 SS blocks) in a beam swept manner. Similar to the base station 105, a UE 115 may contain multiple antennas and may weight its antennas to form multiple receive beams. The UE 115 may sweep receive beams as it receives one or more of the SS blocks and determine a preferred or suitable downlink beam pair (e.g., including the best performing combination of downlink transmit beam and downlink receive beam). The UE 115 may then report the identified transmit beam to the base station 105.

Wireless communications system 100 may also support power saving techniques. For instance, a base station 105 may transmit control information over a narrow bandwidth, where the control information schedules data transmissions to a UE 115 over a larger bandwidth. In this way, a UE 115 may conserve energy since monitoring larger bandwidths is often associated with higher power usage at the UE (e.g., an increased number of samples may be taken by the UE to receive larger bandwidth signals). Once a UE 115 identifies control information intended for the UE 115 in the narrowband, the UE 115 may identify a subsequent location (e.g., time and frequency location) for receiving data from the base station 105 over a wider band. In some cases, the control information (e.g., a downlink grant) indicates the location to the UE 115. However, the UE 115 may first reconfigure the receive chain from a narrowband configuration to a wideband configuration before receiving the wideband data. Transitioning, or retuning, the receive chain from a narrowband to a wideband configuration often takes a certain amount of time (e.g., tens of microseconds up to milliseconds). The time it takes for a UE to transition, or retune, a receive chain may be referred to as "retuning delay." Thus, a base station 105 may include a transmission gap that spans the retuning delay between transmitting control information and data to accommodate the retuning of the receive chain by the UE 115. Including a transmission gap between control and data transmissions may increase system latency.

In some cases, aspects of the wireless communications system 100 including a base station 105 or UE 115 may employ techniques to utilize the transmission gap between narrowband control and wideband data transmission discussed above. For instance, a base station 105 may schedule control information transmissions to other UEs 115 (e.g., associated with other beams) during the transmission gap. In this way, the latency introduced into the wireless communications system 100 by a transmission gap may be reduced.

Figure 2:
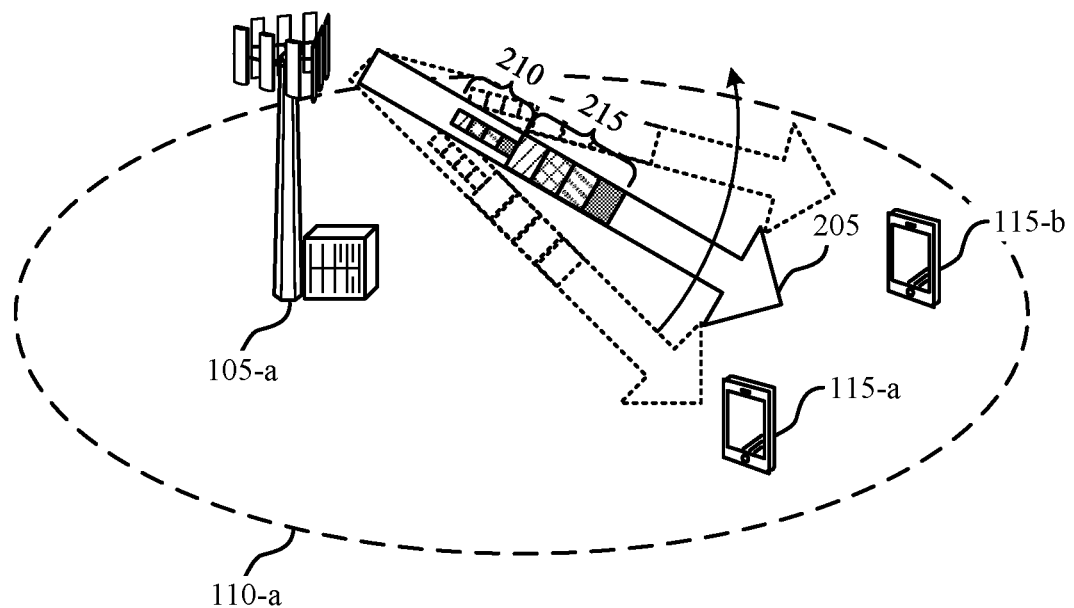
FIG. 2 illustrates an example of a wireless communication subsystem that supports multiplexing clustered control information and data in accordance with various aspects of the present disclosure.

FIG. 2 illustrates an example of a wireless communications subsystem 200 that supports multiplexing clustered control information and data in accordance with various aspects of the present disclosure. Wireless communications subsystem 200 may include UE 115-a, UE 115-b, and base station 105-a, which may be examples of a UE 115 or a base station 105 and may communicate with one another as described above with reference to FIG. 1. Wireless communications subsystem 200 may include a communication link 205, which may be used to convey control information 210 and data 215.

In some examples, base station 105-a successively transmits SS blocks in a beam swept manner (e.g., transmits a first SS block in a first beam/beam direction, a second SS block in a second beam/beam direction, and so on) for detection by UEs, as discussed above with reference to FIG. 1. UE 115-a and UE 115-b may identify a preferred beam (e.g., as part of a downlink beam pair) based on the transmitted SS blocks and may indicate their respective preferences to base station 105-a, which may use the preferred beams for subsequent transmissions to UE 115-a and UE 115-b. For instance, UE 115-a may prefer a first beam while UE 115-b may prefer a second beam.

Base station 105-a may also use a narrowband control channel that schedules a wideband data channel for certain transmissions, as discussed above with reference to FIG. 1. For example, base station 105-a may configure UEs 115-a and 115-b for respective control channel resource sets that are respective narrowband subsets of a carrier bandwidth, while data transmissions may use a wider bandwidth up to the carrier bandwidth as allocated by downlink control information carried by the control channel resource sets. In some examples, a control channel resource set is assigned for a UE 115 by parameters that define a number of symbol periods and frequency bandwidth for the control channel resource set. The UE 115 then monitors the control channel resource set at the beginning of each slot for downlink control information that indicates, for example, SIB messages, random access response messages, paging messages, and/or downlink or uplink grant messages using this configuration.

In some examples, UE 115-a and UE 115-b may determine a retuning delay for retuning a receiver from a narrowband receiving configuration to a wideband receiving configuration, and may each transmit an indication of their respective retuning delays to base station 105-a. Base station 105-a may use the received indications to determine a delay between transmitting control information to UE 115-a and UE 115-b and transmitting data scheduled by the control information. In other examples, a fixed delay between narrowband control channel transmissions and data transmissions may be applied by the base station 105-a.

In some cases, base station 105-a may indicate to UEs 115-a and 115-b that a control information cluster mode is to be used for control information transmissions. For instance, base station 105-a may utilize the control information cluster mode for certain types of transmissions, such as a SIB messages, RACH response messages, paging messages, or user data. In some cases, base station 105-a may implement a clustered transmission scheme when there is insufficient room for PDSCH transmissions to be transmitted with a clustered transmission of SS blocks. For example, base station 105-a may have the option to configure a RMSI CORESET and its associated PDSCH to cluster PDSCH together due to lack of room for PDSCH in a cluster of SSBs transmissions.

In some cases, base station 105-*a* may schedule UE 115-*a* and UE 115-*b* to receive information according to a clustered transmission scheme based on retuning periods of UE 115-*a* and UE 115-*b*. For instance, base station 105-*a* may schedule control information for UE 115-*a* in a first control channel resource set and a corresponding data transmission for UE 115-*a* in data resources that are separated in time from the first control channel resource set by a time period (or "a retuning delay period") that is equivalent to at least the retuning delay indicated by UE 115-*a*. Base station 105-*a* may also schedule control information for UE 115-*b* in a second control channel resource set in additional control resources during the retuning delay period. In some cases, base station 105-*a* may also schedule control information for additional UEs in subsequent control channel resource sets during the retuning delay period until all of the control resources available during the retuning delay period are utilized. In some cases, the first, second, and/or third control channel resource sets may compose a control information transmission cluster.

Base station 105-*a* may subsequently receive user data for transmission to UE 115-*a* and UE 115-*b*. Accordingly, base station 105 may transmit control information for UE 115-*a* that schedules the user data for UE 115-*a* in a first control channel resource set and subsequently transmit the control information for UE 115-*b* that schedules the user data for UE 115-*b* in a second control channel resource set within the same control information transmission cluster. In some cases, the control information transmission cluster spans a single slot, while in other cases, the control information transmission spans multiple slots. Each control channel resource of the control information transmission cluster may be associated with a transmit beam. For example, base station 105-*a* may transmit the control information for UE 115-*a* in a first portion of a slot in a first beam direction and the control information for UE 115-*b* in a second portion of the slot in a second beam direction.

In some cases, a UE may apply a quasi-co-location assumption between an SS block and a set of PDCCH occasions the UE monitors. For instance, UEs, such as UE 115-*a* and UE 115-*b*, may identify locations for their control information within the slot based on their corresponding control channel resource set and a beam index (e.g., an SS beam index or CSI-RS beam index). For example, UE 115-*a* may have selected beam 1 as a preferred beam and may determine that its control channel resource set is in a first portion of a slot and transmitted using beam 1. In some examples, a location of a control channel resource set (e.g., PDCCH) may be a function of SSB index (e.g., pattern 1 of RMSI CORESET transmission). Similarly, UE 115-*b* may have selected beam 2 and may determine that its control channel resource set is in a second portion of the slot and transmitted using beam 2. As discussed above, the control channel resource set for UE 115-*b* may be located after the control channel resource set of UE 115-*a*, but within a subsequent delay period. In this way, base station 105-*a* may utilize the retuning delay period of UE 115-*a* and reduce system latency.

In some cases, the lengths of each portion of the slot may be determined by the length of the corresponding control channel resource sets. For example, each control channel resource set may have a duration of one symbol period and thus, in a clustered control information transmission mode, each UE may identify its control channel resource set by identifying a symbol period of the slot corresponding to its preferred beam index. In other cases, each control channel resource set may have a duration of multiple symbol periods (e.g., 2 symbol periods) and a first UE may identify its control channel resource set by identifying the first multiple symbol periods (e.g., the first and second symbol periods), a second UE may identify its control channel resource set by identifying the next multiple symbol periods (e.g., the third and fourth symbol periods), and so on.

In some cases, slots may be partitioned further into mini-slots, which may be defined as one or more symbol periods and may be indexed within each slot. In some cases, a control information transmission cluster spans multiple slots, or mini-slots, and control channel resource sets span full slots, or mini-slots, in which case, a UE may identify its control channel resource set by identifying a slot number or mini-slot number that corresponds to a preferred beam direction. For instance, a first UE that prefers beam 1 may identify its control channel resource set by identifying the first slot or first set of slots in the control information transmission cluster, a second UE that prefers beam 2 may identify its control channel resource set in the next slot or set of slots and so on.

In other cases, base station 105-*a* may direct UE 115-*a* and UE 115-*b* to monitor a specific beam or set of beams within the control information transmission cluster. For instance, base station 105-*a* may direct UE 115-*a* to monitor a first beam direction having a first index of the control information transmission cluster. After identifying its control information, UE 115-*a* and UE 115-*b* may determine a location of a corresponding data transmission. In some cases, the control information for UE 115-*a* in a first control channel resource set indicates the location of the corresponding data transmission for UE 115-*a* and control information for UE 115-*b* in a second control channel resource set indicates the location of the corresponding data transmission for UE 115-*b*. In some examples, the control information indicates that the location of the corresponding data transmission is in a same slot as the control information, which may be referred to as cross-symbol scheduling. While in other examples the control information indicates that the location of the corresponding data transmission is in a different slot as the control information, which may be referred to as cross-slot scheduling. For example, the control information may indicate a starting symbol period within the slot for the data transmission or the offset between the symbol period carrying the control information and a first symbol period of the data transmission, which may be in the same or a subsequent slot.

Figure 3:
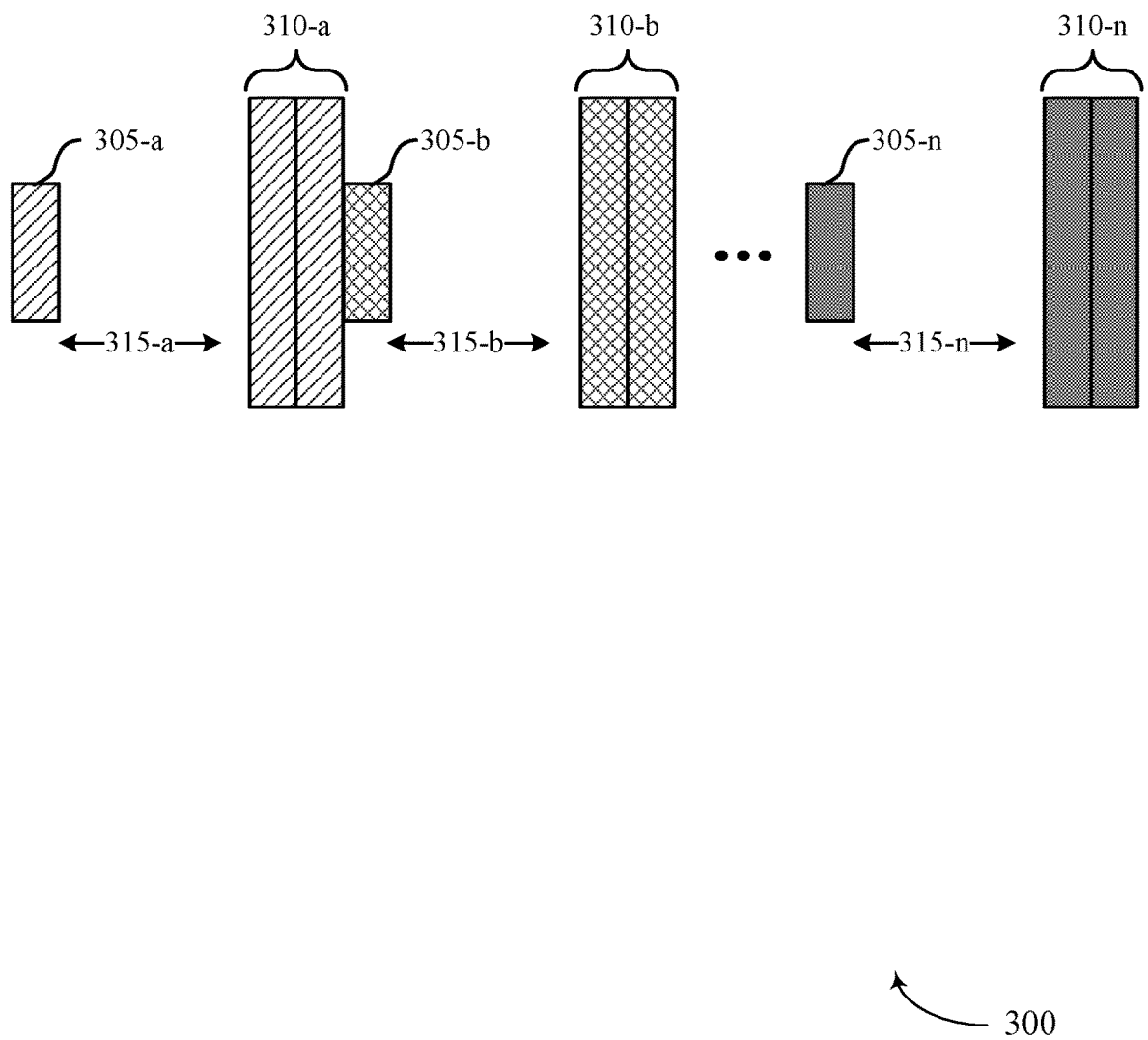
FIG. 3 illustrates an example transmission configuration for multiplexing control information and data in accordance with various aspects of the present disclosure.

FIG. 3 illustrates an example of a transmission configuration 300 of multiplexed control information and data in accordance with various aspects of the present disclosure. Transmission configuration 300 may illustrate aspects of a transmission between a UE 115 and a base station 105, as described above with reference to FIGS. 1-2. Transmission configuration 300 may include first control channel resource set 305-*a*, second control channel resource set 305-*b*, third control channel resource set 305-*n*, first data resources 310-*a*, second data resource 310-*b*, third data resources 310-*n*, first retuning delay period 315-*a*, second retuning delay period 315-*b*, and third retuning delay period 315-*n*. Transmission configuration 300 may be an example of a distributed scheme for transmitting control information and user data.

A base station may use control channel resource sets 305 to transmit control information to one or more UEs. For instance, first control channel resource set 305-*a* may carry control information for a first UE, second control channel resource set 305-b may carry control information for a second UE, and so on. In some cases, the control channel resource sets 305 are transmitted over a narrow bandwidth. By transmitting control channel resource sets 305 over a narrow bandwidth, a UE may conserve energy by monitoring only the narrow bandwidth—e.g., by taking fewer samples—and a base station may similarly conserve energy. In some cases, the base station transmits control information included in first control channel resource set 305-a in a first beam direction, control information included in second control channel resource set 305-b in a second beam direction, and so on.

A base station may use data resources 310 to transmit user to data to one or more UEs. In some cases, control channel resource sets 305 are used to schedule data resources 310 for a UE. For instance, control channel resource set 305-a may schedule data resources 310-a for the first UE. A base station may employ cross-slot or cross-symbol scheduling based on whether a UE supports cross-slot or cross-symbol scheduling. In some cases, the data resources 310 are transmitted over a larger or different bandwidth than—e.g., using different sub-carriers—the control channel resource sets 305. By using a larger bandwidth for data transmissions, a base station may communicate more data than with a narrow bandwidth. In other cases, the data resources 310 are transmitted over a same bandwidth as the control channel resource sets 305.

In order to receive the larger bandwidth data transmissions, a UE may retune a receiver from a narrowband receiving mode to a wideband receiving mode. This retuning delay period 315 may be associated with a certain amount of time (e.g., from microseconds to milliseconds) and may vary from one UE to another. Due to the retuning delay period 315, a base station 105 may separate control transmissions and data transmission by a time period that is equivalent to at least the retuning delay period 315. For instance, the base station may transmit control information for a first UE during first control channel resource set 305-a and may schedule/transmit data for the first UE during first data resources 310-a after retuning delay period 315-a has passed. In some cases, the UEs indicate to the base station a value corresponding to a respective retuning delay period 315. In other cases, the base station may use an average or worst case value for determining retuning delay period 315. In some cases, retuning delay periods 315 may result in portions of a slot that are unused.

Although control channel resource sets 305-a to 305-n are depicted as using frequency resources that share a common frequency bandwidth and size, in some cases control channel resource sets 305-a to 305-n may be offset from one another, non-overlapping (e.g., in different sub-carrier regions), and/or different bandwidths. Similarly, data resources 310-a to 310-n may be offset from one another, non-overlapping (e.g., in different sub-carrier regions), and/or different bandwidths. In some cases, data resources 310-a may be a same size or smaller than control channel resource set 305-a.

Figure 4:
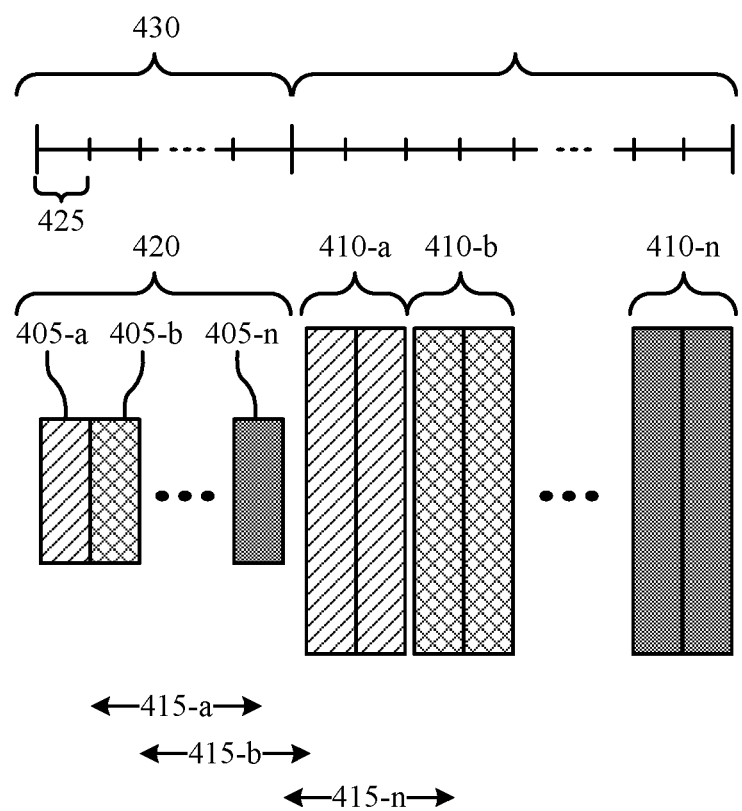
FIGS. 4-5 illustrate example transmission configurations for multiplexing clustered control information and data in accordance with various aspects of the present disclosure.

FIG. 4 illustrates an example of a transmission configuration 400 of multiplexed clustered control information and data in accordance with various aspects of the present disclosure. Transmission configuration 400 may illustrate aspects of a transmission between a UE 115 and a base station 105, as described above with reference to FIGS. 1-2. Transmission configuration 400 may include a control information transmission cluster 420 that includes first control channel resource set 405-a, second control channel resource set 405-b, third control channel resource set 405-n. Transmission configuration 400 may also include first data resources 410-a, second data resource 410-b, third data resources 410-n, first retuning delay period 415-a, second retuning delay period 415-b, and third retuning delay period 415-n. In some cases, transmission configuration 400 may be configured according to symbol periods 425 and slots 430.

Transmission configuration 400 may be an example of a clustered scheme for transmitting control information and user data. In some cases, the base station may switch between the distributed mode of transmitting control and data information, as depicted in FIG. 3, and the control information transmission cluster scheme. For instance, the base station may indicate to served UEs that the control information transmission cluster scheme is being used during an initial access procedure, via signaling in a master information block (MIB), system information block (SIB), radio resource control (RRC) signaling, in a medium access control (MAC) control element (CE), or in downlink control information (DCI). The base station may similarly indicate to served UEs when the distributed mode of transmitting control and data information is being used. In some examples, the control information transmission cluster scheme is used to schedule multiple UEs during an on time of a discontinuous reception (DRX) cycle.

In some examples, a base station may schedule control and data transmissions in clusters. For instance, a base station may schedule clustered control and associated data transmissions after determining that there are insufficient resources to transmit data (or PDSCH) transmissions in a cluster of SS block transmissions. By scheduling control and data transmission in this way, the base station may reduce latency introduced into the wireless system by retuning delay periods 415. For instance, after indicating to one or more UEs that a clustered transmission scheme is being used, the base station may schedule a control information transmission cluster 420 including first control channel resource set 405-a and control channel resource sets 405-b to 405-n. In some examples, control channel resource sets 405-b to 405-n may span a time period equivalent to the first returning delay 415-a subsequent to first control channel resource set 405-a. In other examples, control channel resource sets 405-b to 405-n may span a time period longer than the first returning delay 415-a, which may be selected based on a number of beams and duration of each of the control channel resource sets 405. The clustered control channel resource sets 405-a to 405-n may schedule clustered data resources 410-a to 410-n for respective UEs.

A base station may indicate, to one or more UEs, techniques for identifying control channel resource sets in the control information transmission cluster 420. For example, the base station may indicate to a UE a specific transmission beam for the UE to monitor for control information during a control information transmission cluster 420. For instance, the base station may indicate to a first UE to monitor a first transmission beam direction, and the first UE may monitor control channel resource set 405-a as discussed above. In one example, the base station may indicate the transmission beam to monitor by providing an index to the control information transmission cluster 420, or a bitmap that indicates the beams within the control information transmission cluster 420 to be monitored. In other cases, the base station may transmit to a UE a bitmap that indicates how beams, such as an SS beam or a CSI-RS beam, map to symbol periods, slots, or mini-slots of a control information transmission cluster 420. The base station may also indicate to a UE to monitor the beam and corresponding symbol period(s), slot(s), or mini-slot(s) based on a preferred beam selected by the UE.

In one example, a base station may transmit successive SS blocks and receive indications for preferred transmission beams for one or more UEs, as discussed above with reference to FIGS. 1 and 2. The base station may use indications from the one or more UEs of their preferred transmission beams to indicate which control channel resource sets 405 belong to which UEs. For instance, a first UE may indicate a preference for a first beam direction and a second UE may indicate a preference for a second beam direction. The base station may assign a location of a UEs control information in the control information transmission cluster 420 based on the UE preferred beam direction. Thus, the first UE may identify that the first control channel resource set 405-a has control information for the first UE, the second UE may identify that the second control channel resource set 405-b has control information for the second UE, and so on.

In some examples, the first UE may indicate to the base station a preference for a first beam (e.g., by sending a beam index) and the second UE may indicate to the base station a preference for a second beam. The base station may then schedule and transmit control information for the first UE in first control channel resource set 405-a which is transmitted using a first beam and control information for the second UE in second control channel resource set 405-b which is transmitted using a second beam. After indicating a preference for the first beam, the first UE may monitor the first beam and the first symbol period or first symbol periods of a slot 430. In some cases, a UE may continuously monitor slots or may monitor designated slots for control information.

The base station may then transmit the control information in a beam swept manner, the first control channel resource set 405-a being transmitted using a first beam and the second control channel resource set 405-b being transmitted using a second beam. After the base station transmits control information transmission cluster 420, the first UE may identify its control information in first control channel resource set 405-a by monitoring the first beam and the first symbol period(s) of the slot. Similarly, the second UE may identify its control information in second control channel resource set 405-b by monitoring the second beam and the next symbol period(s), and so on for the remaining UEs scheduled in control information transmission cluster 420. Although control channel resource sets 405 may be scheduled according to symbol periods, in some cases, control channel resource sets 405 and data resources may be scheduled according to slots, or mini-slots, in which case a beam index may correspond to a slot or mini-slot.

In some cases, control channel resource sets 405-a to 405-n are transmitted so that first control channel resource set 405-a are transmitted in a first direction, second control channel resource set 405-b are transmitted in a second direction, and so on. In other cases, first control channel resource set 405-a may be transmitted in a direction that is not the first direction, control channel resource set 405-b may be transmitted in a direction that is not the second direction and so on. For instance, first control channel resource set 405-a may be transmitted in a second direction and second control channel resource set 405-b may transmitted in a first direction based on the retuning delay period 415-a for the first UE being longer or shorter than the retuning delay period 415-b for the second UE, in which case a UE may monitor for a control channel resource set 405 in a beam and may not monitor a symbol period that corresponds to the beam.

After decoding control information in assigned control channel resource set 405, a UE may identify corresponding data resources. For instance, the first UE may decode control information in first control channel resource set 405-a and the decoded control information may indicate to the UE that a corresponding data transmission is located in first data resources 410-a. In some cases and as depicted, a location of data in a data transmission cluster may correspond to a location of a control channel resource set used to schedule the data. For instance, first control channel resource set 405-a may be located in the first position of the control information transmission cluster 420 and data scheduled by control channel resource set 405-a may be included in first data resources 410-a. Similarly, data scheduled during second control channel resource set 405-b, located in the second position of the control information transmission cluster 420 may schedule data during data resources 410, located in the second position of the data transmission cluster, and so forth.

Figure 5:
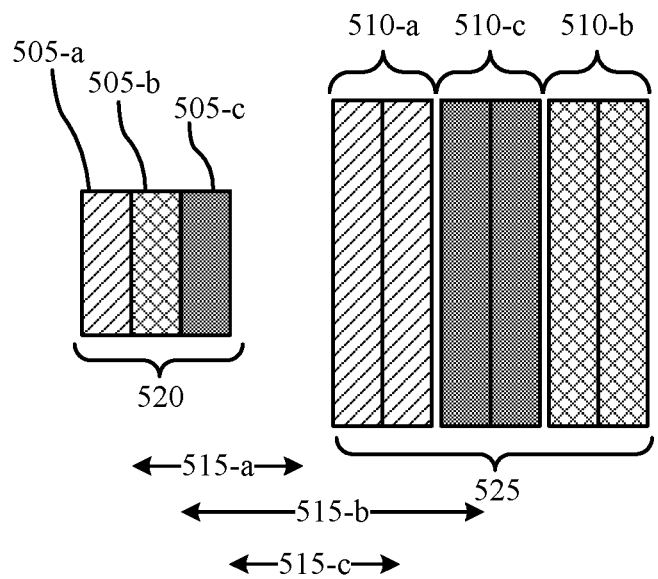

FIG. 5 illustrates an example of a transmission configuration 500 of multiplexed clustered control information and data in accordance with various aspects of the present disclosure. Transmission configuration 500 may illustrate aspects of a transmission between a UE 115 and a base station 105, as described above with reference to FIGS. 1-2. Transmission configuration 500 may include a control information transmission cluster 520 that includes first control channel resource set 505-a, second control channel resource set 505-b, third control channel resource sets 505-n. Transmission configuration 500 may also include first data resources 510-a, second data resource 510-b, third data resources 510-n, first retuning delay period 515-a, second retuning delay period 515-b, and third retuning delay period 515-n.

In some examples, a location of a control channel resource set 505 in a control information transmission cluster 520 does not necessarily correspond to a location of data resource in a data resource set 525. For instance, a base station may transmit first control channel resource set 505-a in the first location of control information transmission cluster 520, second control channel resource set 505-b in the second location of control information transmission cluster 520, and third control channel resource set 505-c in the third location of control information transmission cluster 520, while transmitting data for a first UE scheduled by the first control channel resource set 505-a in the first data resource 510-a, data for a second UE scheduled by the second control channel resource set 505-b in the third data resource 510-c, and data for a third UE scheduled by the third control channel resource set 505-c in the second data resource 510-b As depicted, a location of a control channel resource set 505 in a control information transmission cluster 520 does not necessarily correspond to a location of data resource in a data resource set 525. For instance, a base station may transmit first control channel resource set 505-a in the first location of control information transmission cluster 520, second control channel resource set 505-b in the second location of control information transmission cluster 520, and third control channel resource set 505-c in the third location of control information transmission cluster 520, while transmitting data for a first UE scheduled by the first control channel resource set 505-a in the first data resource 510-a, data for a second UE scheduled by the second control channel resource set 505-b in the third data resource 510-c, and data for a third UE scheduled by the third control channel resource set 505-c in the second data resource 510-b. By scheduling data resources for certain UEs in different locations within data resource set 525 than in control information transmission cluster 520, a base station may accommodate for scenarios in which a UE associated with a second beam and the second control channel resource set 505-b has a longer retuning delay period 515-b than the retuning delay period 515-b for the third UE associated with the third beam and the third control channel resource set 505-c.

Figure 6:
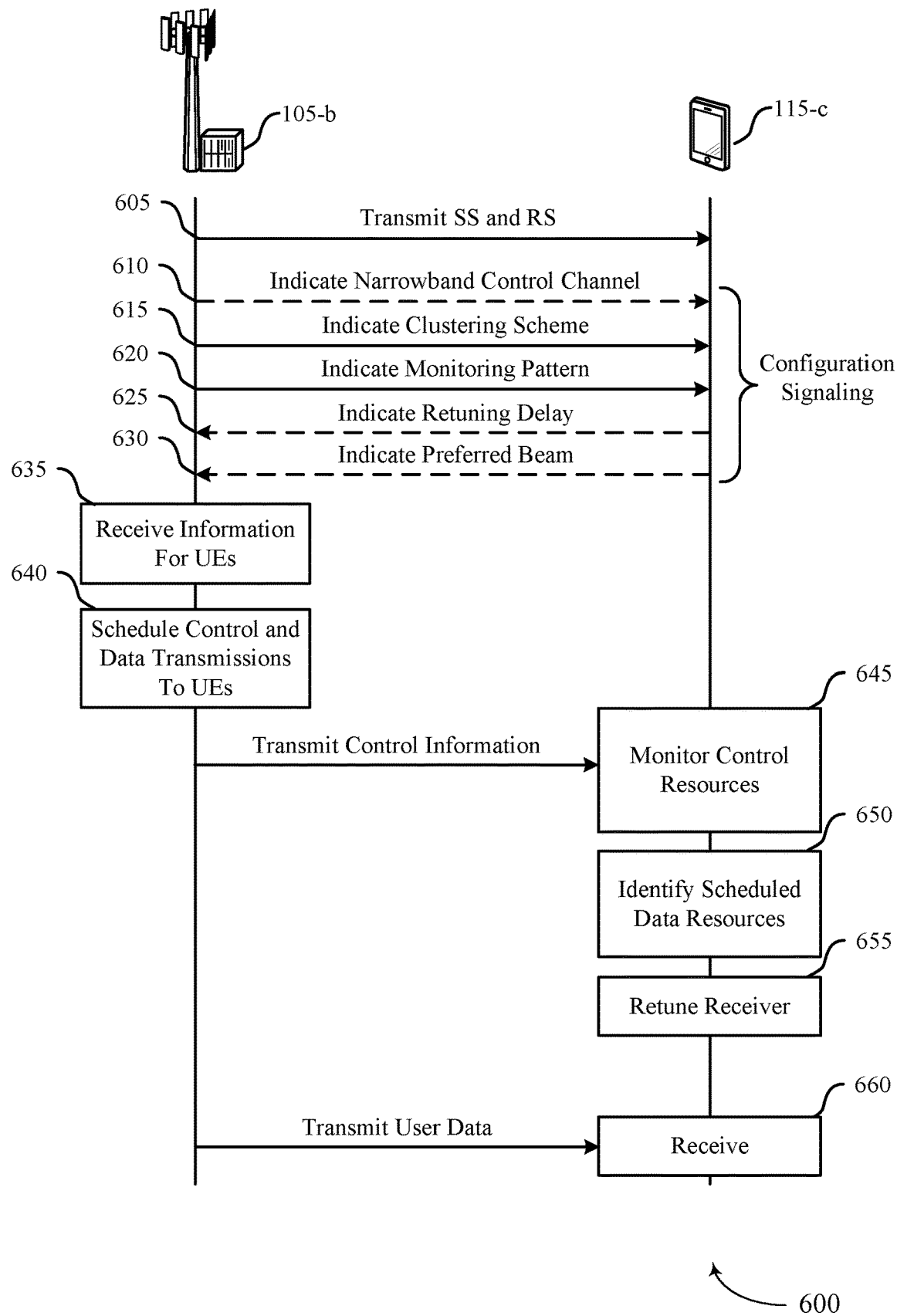
FIG. 6 illustrates an example of a process flow for multiplexing clustered control information and data in accordance with various aspects of the present disclosure.

FIG. 6 illustrates an example of a process flow 600 for multiplexing clustered control information and data in accordance with various aspects of the present disclosure. Process flow 600 may be performed by UE 115-b and base station 105-b, which may be an example of a UE 115 and base station 105 described above with reference to FIGS. 1-2. In some examples, base station 105-b operating in a low power mode may transmit control information to one or more UEs, including UE 115-c using a control information transmission cluster scheme.

At step 605, base station 105-b may transmit synchronization and/or reference signals. In some cases, base station 105-b transmits successive SS blocks in a beam swept manner. Base station 105-b may similarly transmit reference signals, such as CSI-RS, in a beam swept manner.

In steps 610 to 630, base station 105-b and UE 115-c may exchange configuration signaling. In some cases, base station 105-b transmits its configuration signaling to UE 115-c in a MIB, a SIB, RRC signaling, MAC CE, or in DCI. For instance, base station 105-b may transmit configuration signaling including an indication of a control channel resource set, a control information transmission scheme (e.g., distributed transmission scheme or a clustered transmission scheme), and/or a monitoring pattern for control channel resource sets. In some cases, base station 105-b indicates a clustered transmission scheme after determining that there is insufficient resources available for data transmissions (e.g., PDSCH transmissions) in a cluster transmitting SS blocks. UE 115-c may transmit configuration signaling including a retuning delay and/or a preferred beam direction.

At step 610, base station 105-b may indicate to UE 115-c that base station 105-b is transmitting a control channel using a narrowband (e.g., by configuring a narrowband control channel resource set for the UE 115-c). In some cases, UE 115-c may determine that downlink control information is to be transmitted using a narrow bandwidth and may configure a receiver to receive a narrow frequency range to conserve power.

At step 615, base station 105-c may indicate to UE 115-c that a clustering scheme will be used for control information transmissions. In some examples, the clustering scheme for control information transmissions is implemented as discussed with reference to FIG. 4.

At step 620, base station 105-c may also indicate a pattern to UE 115-c, which UE 115-c may use to monitor a control information resource set for control information assigned to UE 115-c. In some cases, base station 105-c explicitly indicates a transmission beam direction for UE 115-c to monitor in a control information transmission cluster. In other cases, base station 105-c may transmit a bitmap to UE 115-c which maps beams, such as SS beams or CSI-RS beams, to symbol periods or mini-slots of a control information cluster.

At step 625, UE 115-c may indicate a delay associated with retuning a receiver from the first bandwidth to the second bandwidth ("retuning delay") to base station 105-b. In some cases, UE 115-c may indicate the retuning delay based on determining that a narrow bandwidth control channel is being used by base station 105-b.

At step 630, UE 115-c may indicate a preferred beam to base station 105-b. In some examples, UE 115-c identifies a preferred beam based on previously transmitted SS blocks or beamformed CSI-RS signals. UE 115-c may also indicate a cross-slot or cross-symbol scheduling capability. Base station 105-c may apply cross-slot or cross-symbol scheduling based on the indicated capability.

At step 635, base station 105-b may receive control layer signaling or data for one or more UEs, including UE 115-c. In some examples, base station 105-b may receive user data for UE 115-c and may schedule a paging request for UE 115-c using a control information cluster scheme. In other examples, base station 105-b may generate system information for UE 115-c and may schedule a MIB or SIB message for UE 115-c and other UEs using a control information cluster scheme. In other cases, base station 105-b may receive user data for UE 115-c, and may schedule UE 115-c using a control information cluster scheme.

At step 640, base station 105-b may schedule control and data transmissions to the UEs. In some cases, base station 105-b may schedule the control and data transmissions in accordance with the control information cluster transmission scheme. For instance, base station 105-b may schedule control and data transmissions for UE 115-c such that a time difference between transmitting the control information and the data transmissions is at least as long as a retuning interval.

At step 645, base station 105-b may transmit control information to the UEs. In some cases, base station 105-b may transmit the control information for the UEs over successive control channel resource sets in a control information transmission cluster, similar to the configuration of the control channel resource sets of FIG. 4. In some cases, base station 105-b may transmit the control information in a beam swept pattern. For instance, base station 105-b may transmit first control information for UE 115-c over a first control channel resource set in a first direction, second control information for a second UE over a second control channel resource set in a second direction, and so on. In some cases, base station 105-b may transmit the first control information in the first one or more symbol periods of a transmission slot, the second control information in the next one or more symbol periods of the transmission slot, and so on. In some cases, base station 105-b may include control information for UE 115-c in a symbol period of the transmission slot that corresponds to a preferred beam direction of UE 115-c. For instance, base station 105-b may transmit the control information for UE 115-c in the first two symbol periods and in the first beam direction.

Also at step 645, UE 115-c may monitor a control channel resource set for a control information transmission from base station 105-b. During the monitoring, UE 115-c may receive the control information transmitted by base station 105-b in a control channel resource set identified by UE 115-c, and may blind decode the control information based on the indicated monitoring pattern. In some examples, a UE may apply a quasi-co-location assumption between SS blocks and a set of PDCCH occasions the UE monitors. For instance, the identified control channel resource set may be associated with a first beam direction and correlated symbol periods. Thus, UE 115-c may monitor its preferred beam direction or a beam direction designated by base station 105-b for control information. Additionally or alternatively, UE 115-c may monitor the first two symbol periods of a slot containing control information. UE 115-*c* may decode the signals received in the control channel resource, and may identify that the control information is for UE 115-*c*. In some examples, UE 115-*c* may monitor multiple preferred beam directions and/or multiple sets of symbol periods in a slot.

At step 650, UE 115-*c* may identify data resources that are scheduled for a data transmission to UE 115-*c*. In some cases, UE 115-*c* identifies a location of the data resources based on the received control information. For instance, the control information may indicated to UE 115-*c* that frequency resources in designated symbol periods are allocated for a downlink transmission to UE 115-*c*.

At step 655, UE 115-*c* may retune its receiver to be configured to receive data over a different bandwidth (e.g., a wide bandwidth) than the bandwidth used to receive the control information. As discussed above, retuning a receiver may take a certain amount of time ranging from one symbol period to multiple symbol periods (e.g., up to 10 symbol periods).

At step 660, base station 105-*b* may transmit data for UE 115-*c* in scheduled data resource after a retuning interval has expired since transmitting the control information for UE 115-*c*. Also at step 660, UE 115-*c* may receive the data transmission over the wideband frequency.

Figure 7:
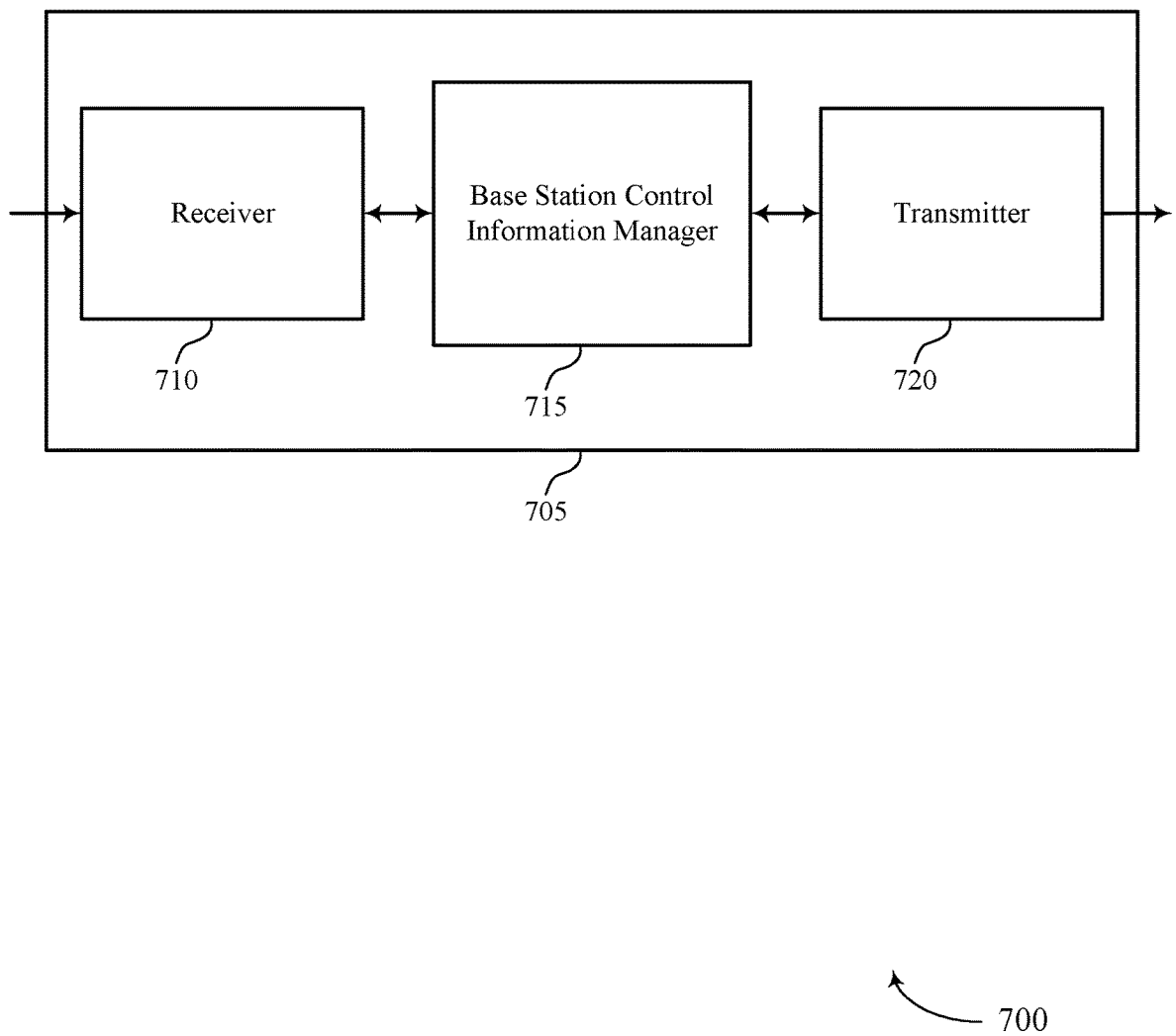
FIGS. 7 and 8 show block diagrams of a device that supports multiplexing clustered control information and data in accordance with aspects of the present disclosure.

FIG. 7 shows a block diagram 700 of a wireless device 705 that supports multiplexing clustered control information and data in accordance with aspects of the present disclosure. Wireless device 705 may be an example of aspects of a base station 105 as described herein. Wireless device 705 may include receiver 710, base station control information manager 715, and transmitter 720. Wireless device 705 may also include a processor. Each of these components may be in communication with one another (e.g., via one or more buses).

Receiver 710 may receive information such as packets, user data, or control information associated with various information channels (e.g., control channels, data channels, and information related to multiplexing clustered control information and data, etc.). Information may be passed on to other components of the device. The receiver 710 may be an example of aspects of the transceiver 935 described with reference to FIG. 9. The receiver 710 may utilize a single antenna or a set of antennas.

Base station control information manager 715 may be an example of aspects of the base station control information manager 915 described with reference to FIG. 9.

Base station control information manager 715 and/or at least some of its various sub-components may be implemented in hardware, software executed by a processor, firmware, or any combination thereof. If implemented in software executed by a processor, the functions of the base station control information manager 715 and/or at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. The base station control information manager 715 and/or at least some of its various sub-components may be physically located at various positions, including being distributed such that portions of functions are implemented at different physical locations by one or more physical devices. In some examples, base station control information manager 715 and/or at least some of its various sub-components may be a separate and distinct component in accordance with various aspects of the present disclosure. In other examples, base station control information manager 715 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

Base station control information manager 715 may transmit an indication of which of a clustered scheme or a distributed scheme is configured for control information transmissions, transmit, during first time resources, first control information scheduling a first data transmission during second time resources, the first time resources being selected based on the indication. Base station control information manager 715 may also transmit, during third time resources, second control information scheduling a second data transmission during fourth time resources, the third time resources being selected based on the indication. Base station control information manager 715 may also transmit the first data transmission during the second time resources, and transmit the second data transmission during the fourth time resources.

Base station control information manager 715 may identify, for a first user equipment (UE) served by the base station, a first delay associated with retuning a receive bandwidth of a receiver of the first UE. Base station control information manager 715 may also identify, for a second UE served by the base station, a second delay associated with retuning a receive bandwidth of a receiver of the second UE. Base station control information manager 715 may also transmit, during first time resources over a first frequency bandwidth, a first downlink grant that schedules a first data transmission for the first UE during second time resources over a second frequency bandwidth, the second time resources being selected based on the first time resources and the first delay. Base station control information manager 715 may also transmit, during third time resources over a third frequency bandwidth, a second downlink grant that schedules a second data transmission for the second UE during fourth time resources over a fourth frequency bandwidth, the fourth time resources being selected based on the third time resources and the second delay. Base station control information manager 715 may also transmit the first data transmission during the second time resources over the second frequency bandwidth. Base station control information manager 715 may also transmit the second data transmission during the fourth time resources over the second frequency bandwidth.

Transmitter 720 may transmit signals generated by other components of the device. In some examples, the transmitter 720 may be collocated with a receiver 710 in a transceiver module. For example, the transmitter 720 may be an example of aspects of the transceiver 935 described with reference to FIG. 9. The transmitter 720 may utilize a single antenna or a set of antennas.

Figure 8:
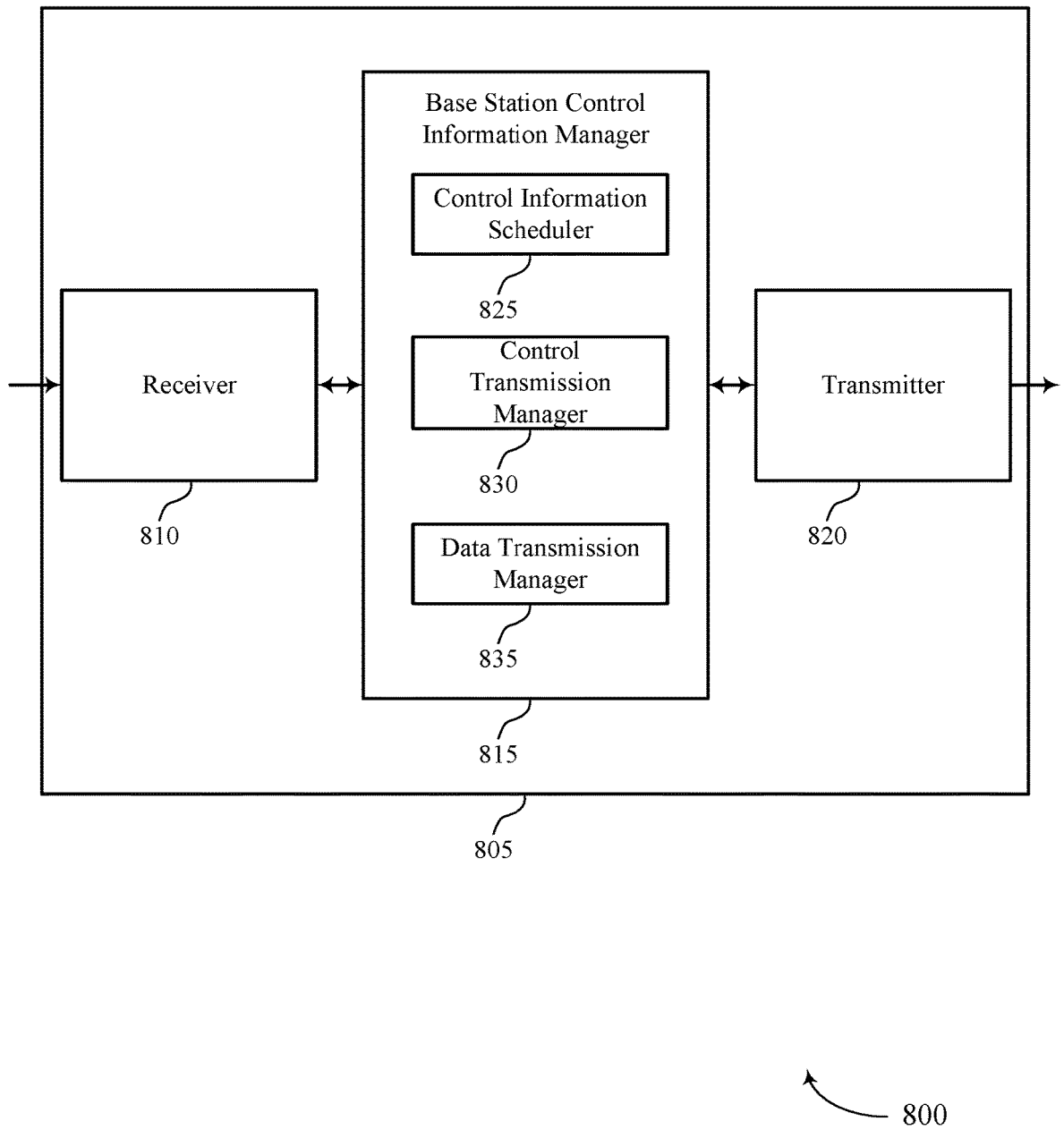

FIG. 8 shows a block diagram 800 of a wireless device 805 that supports multiplexing clustered control information and data in accordance with aspects of the present disclosure. Wireless device 805 may be an example of aspects of a wireless device 705 or a base station 105 as described with reference to FIG. 7. Wireless device 805 may include receiver 810, base station control information manager 815, and transmitter 820. Wireless device 805 may also include a processor. Each of these components may be in communication with one another (e.g., via one or more buses).

Receiver 810 may receive information such as packets, user data, or control information associated with various information channels (e.g., control channels, data channels, and information related to multiplexing clustered control information and data, etc.). Information may be passed on to other components of the device. The receiver 810 may be an example of aspects of the transceiver 935 described with reference to FIG. 9. The receiver 810 may utilize a single antenna or a set of antennas.

Base station control information manager 815 may be an example of aspects of the base station control information manager 915 described with reference to FIG. 9. Base station control information manager 815 may also include control information scheduler 825, control transmission manager 830, and data transmission manager 835.

Control information scheduler 825 may transmit an indication of which of a clustered scheme or a distributed scheme is configured for control information transmissions. In some examples, the control information scheduler 825 may indicate a monitoring pattern for the control information transmission cluster. In some cases, the indication indicates that the clustered scheme is configured for control information transmissions, and the first control information and the second control information are transmitted in a control information transmission cluster. In which case, the second time resources and the fourth time resources occur after the first time resources and the third time resources. In some cases, the indication indicates that the distributed scheme is configured for control information transmissions. In which case, the second time resources may occur after the first time resources, the third time resources may occur after the second time resources, and the fourth time resources may occur after the third time resources.

Control information scheduler 825 may identify, for a first UE served by the base station, a first delay associated with retuning a receive bandwidth of a receiver of the first UE. Control information scheduler 825 may also identify, for a second UE served by the base station, a second delay associated with retuning a receive bandwidth of a receiver of the second UE. In some cases, control information scheduler 825 may transmit an indication that control information transmissions are configured in a control information transmission cluster. Control information scheduler 825 may also transmit a mapping pattern between a beam pattern corresponding to synchronization signal or reference signal transmissions and a control information beam pattern of the control information transmission cluster. Control information scheduler 825 may also indicate a monitoring pattern for the control information transmission cluster to the first UE or the second UE. Control information scheduler 825 may also receive, from the first UE, a first indication of the first delay, and receive from the second UE, a second indication of the second delay. In some examples, control information scheduler 825 may determine that the first delay is longer than the second delay, and schedule the transmission of the first downlink grant before the transmission of the second downlink grant based on the determination. In some cases, the second time resources are after the first time resources and the fourth time resources are prior to the third time resources.

Control transmission manager 830 may transmit, during first time resources, first control information scheduling a first data transmission during second time resources, the first time resources being selected based on the indication and transmit, during third time resources, second control information scheduling a second data transmission during fourth time resources, the third time resources being selected based on the indication. Control transmission manager 830 transmit first control information and second control information in a control information transmission cluster based on transmitting an indication that the clustered scheme is configured for control information transmissions. When a clustered transmission scheme is configured, the second time resources and the fourth time resources may occur after the first time resources and the third time resources. When a distributed transmission scheme is configured, the second time resources may occur after the first time resources, the third time resources may occur after the second time resources, and the fourth time resources may occur after the third time resources. In some cases, the first frequency bandwidth is smaller than the second frequency bandwidth and the third frequency bandwidth is smaller than the fourth frequency bandwidth. In some cases, the first frequency bandwidth is a same size as the second frequency bandwidth and the third frequency bandwidth is a same size as the fourth frequency bandwidth.

Control transmission manager 830 may transmit, during first time resources over a first frequency bandwidth, a first downlink grant that schedules a first data transmission for the first UE during second time resources over a second frequency bandwidth, the second time resources being selected based on the first time resources and the first delay. Control transmission manager 830 may also transmit, during third time resources over a third frequency bandwidth, a second downlink grant that schedules a second data transmission for the second UE during fourth time resources over a fourth frequency bandwidth, the fourth time resources being selected based on the third time resources and the second delay.

In some cases, the first data transmission or the second data transmission includes a system information block (SIB) message, a random access response message, a paging message, or a user data block. In some cases, the first downlink grant is transmitted in a first beam direction and the second downlink grant is transmitted in a second beam direction. In some cases, the first frequency bandwidth is smaller than the second frequency bandwidth. In some cases, the first frequency bandwidth overlaps in frequency with the second frequency bandwidth. In some cases, the first frequency bandwidth and the third frequency bandwidth are the same. In some cases, the first frequency bandwidth and the third frequency bandwidth are different. In some cases, the second frequency bandwidth and the fourth frequency bandwidth are the same. In some cases, the second frequency bandwidth and the fourth frequency bandwidth are different. In some cases, the first frequency bandwidth is non-overlapping in frequency with the second frequency bandwidth.

Data transmission manager 835 may transmit the first data transmission during the second time resources. In some cases, the first data may be transmitted over the second frequency bandwidth. Data transmission manager 835 may transmit the second data transmission during the fourth time resources. In some cases, the second data may be transmitted over the second frequency bandwidth or a fourth frequency bandwidth.

Transmitter 820 may transmit signals generated by other components of the device. In some examples, the transmitter 820 may be collocated with a receiver 810 in a transceiver module. For example, the transmitter 820 may be an example of aspects of the transceiver 935 described with reference to FIG. 9. The transmitter 820 may utilize a single antenna or a set of antennas.

Figure 9:
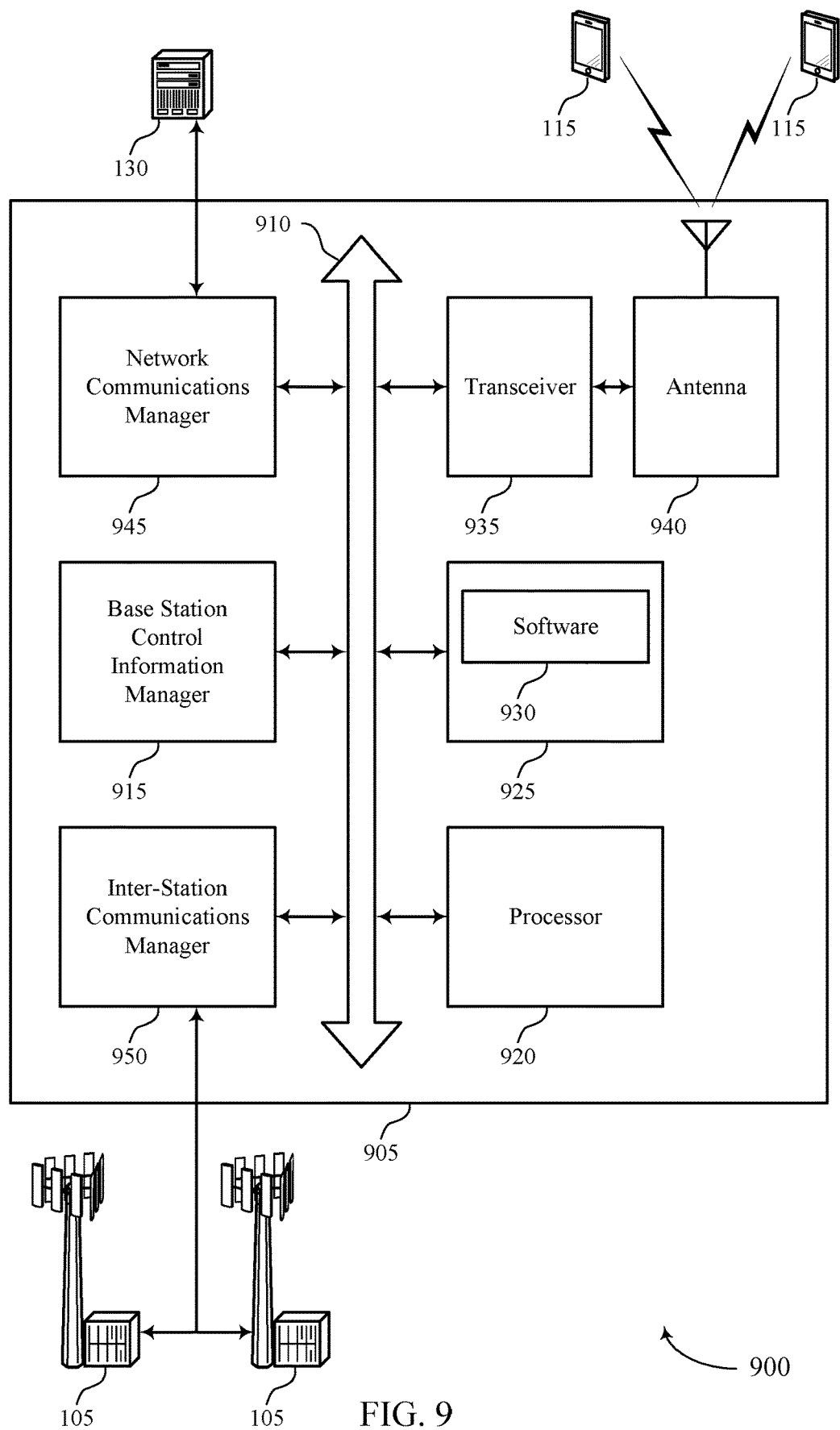
FIG. 9 illustrates a block diagram of a system including a base station that supports multiplexing clustered control information and data in accordance with aspects of the present disclosure.

FIG. 9 shows a diagram of a system 900 including a device 905 that supports multiplexing clustered control information and data in accordance with aspects of the present disclosure. Device 905 may be an example of or include the components of wireless device 705, wireless device 805, or a base station 105 as described above, e.g., with reference to FIGS. 7 and 8. Device 905 may include components for bi-directional voice and data communications including components for transmitting and receiving communications, including base station control information manager 915, processor 920, memory 925, software 930, transceiver 935, antenna 940, network communications manager 945, and inter-station communications manager 950. These components may be in electronic communication via one or more buses (e.g., bus 910). Device 905 may communicate wirelessly with one or more UEs 115.

Processor 920 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, processor 920 may be configured to operate a memory array using a memory controller. In other cases, a memory controller may be integrated into processor 920. Processor 920 may be configured to execute computer-readable instructions stored in a memory to perform various functions (e.g., functions or tasks supporting multiplexing clustered control information and data).

Memory 925 may include random access memory (RAM) and read only memory (ROM). The memory 925 may store computer-readable, computer-executable software 930 including instructions that, when executed, cause the processor to perform various functions described herein. In some cases, the memory 925 may contain, among other things, a basic input/output system (BIOS) which may control basic hardware or software operation such as the interaction with peripheral components or devices.

Software 930 may include code to implement aspects of the present disclosure, including code to support multiplexing clustered control information and data. Software 930 may be stored in a non-transitory computer-readable medium such as system memory or other memory. In some cases, the software 930 may not be directly executable by the processor but may cause a computer (e.g., when compiled and executed) to perform functions described herein.

Transceiver 935 may communicate bi-directionally, via one or more antennas, wired, or wireless links as described above. For example, the transceiver 935 may represent a wireless transceiver and may communicate bi-directionally with another wireless transceiver. The transceiver 935 may also include a modem to modulate the packets and provide the modulated packets to the antennas for transmission, and to demodulate packets received from the antennas.

In some cases, the wireless device may include a single antenna 940. However, in some cases the device may have more than one antenna 940, which may be capable of concurrently transmitting or receiving multiple wireless transmissions.

Network communications manager 945 may manage communications with the core network (e.g., via one or more wired backhaul links). For example, the network communications manager 945 may manage the transfer of data communications for client devices, such as one or more UEs 115.

Inter-station communications manager 950 may manage communications with other base station 105, and may include a controller or scheduler for controlling communications with UEs 115 in cooperation with other base stations 105. For example, the inter-station communications manager 950 may coordinate scheduling for transmissions to UEs 115 for various interference mitigation techniques such as beamforming or joint transmission. In some examples, inter-station communications manager 950 may provide an X2 interface within an Long Term Evolution (LTE)/LTE-A wireless communication network technology to provide communication between base stations 105.

Figure 10:
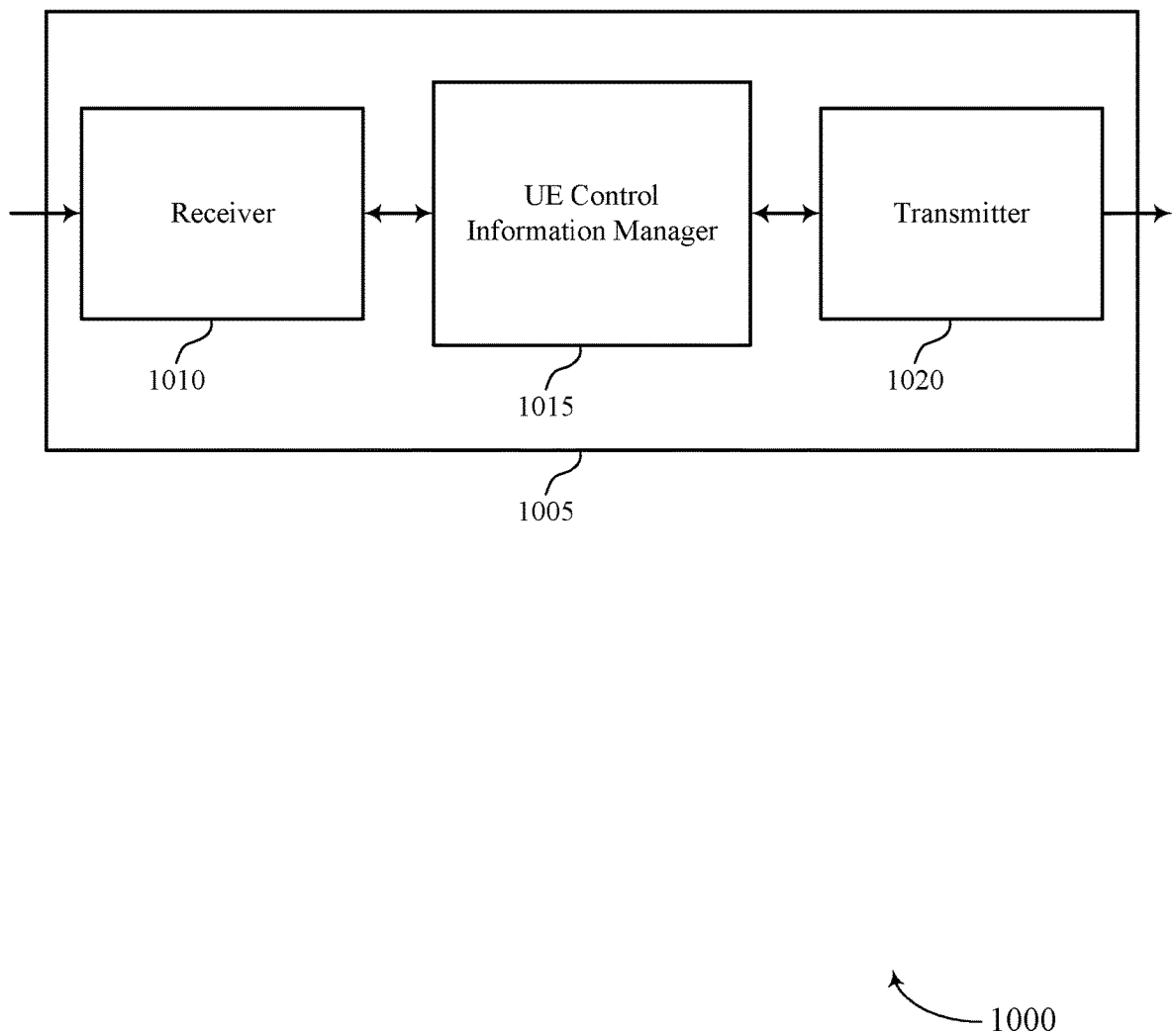
FIGS. 10 and 11 show block diagrams of a device that supports multiplexing clustered control information and data in accordance with aspects of the present disclosure.

FIG. 10 shows a block diagram 1000 of a wireless device 1005 that supports multiplexing clustered control information and data in accordance with aspects of the present disclosure. Wireless device 1005 may be an example of aspects of a UE 115 as described herein. Wireless device 1005 may include receiver 1010, UE control information manager 1015, and transmitter 1020. Wireless device 1005 may also include a processor. Each of these components may be in communication with one another (e.g., via one or more buses).

Receiver 1010 may receive information such as packets, user data, or control information associated with various information channels (e.g., control channels, data channels, and information related to multiplexing clustered control information and data, etc.). Information may be passed on to other components of the device. The receiver 1010 may be an example of aspects of the transceiver 1235 described with reference to FIG. 12. The receiver 1010 may utilize a single antenna or a set of antennas.

UE control information manager 1015 may be an example of aspects of the UE control information manager 1215 described with reference to FIG. 12.

UE control information manager 1015 and/or at least some of its various sub-components may be implemented in hardware, software executed by a processor, firmware, or any combination thereof. If implemented in software executed by a processor, the functions of the UE control information manager 1015 and/or at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. The UE control information manager 1015 and/or at least some of its various sub-components may be physically located at various positions, including being distributed such that portions of functions are implemented at different physical locations by one or more physical devices. In some examples, UE control information manager 1015 and/or at least some of its various sub-components may be a separate and distinct component in accordance with various aspects of the present disclosure. In other examples, UE control information manager 1015 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

UE control information manager 1015 may receive, from a base station, an indication of which of a clustered scheme or a distributed scheme is configured for control information transmissions. UE control information manager 1015 may also monitor, based on the indication, a control information resource set for control information for the UE. UE control information manager 1015 may also identify, during first time resources based on the monitoring, the control information for the UE, the control information scheduling a data transmission for the UE during second time resources. UE control information manager 1015 may also receive the data transmission during the second time resources.

UE control information manager 1015 may receive, from a base station, an indication that control information for the UE is configured in a control information transmission cluster. UE control information manager 1015 may also receive, from the base station, an indication of a control information resource set, the control information resource set associated with a first frequency bandwidth, monitor the control information resource set for the control information for the UE for at least a portion of the control information transmission cluster. UE control information manager 1015 may also identify, during first time resources based on the monitoring, a downlink grant for the UE, the downlink grant scheduling a data transmission for the first UE during second time resources over a second frequency bandwidth. UE control information manager 1015 may also receive the data transmission in the second time resources over the second frequency bandwidth based on the downlink grant.

Transmitter 1020 may transmit signals generated by other components of the device. In some examples, the transmitter 1020 may be collocated with a receiver 1010 in a transceiver module. For example, the transmitter 1020 may be an example of aspects of the transceiver 1235 described with reference to FIG. 12. The transmitter 1020 may utilize a single antenna or a set of antennas.

Figure 11:
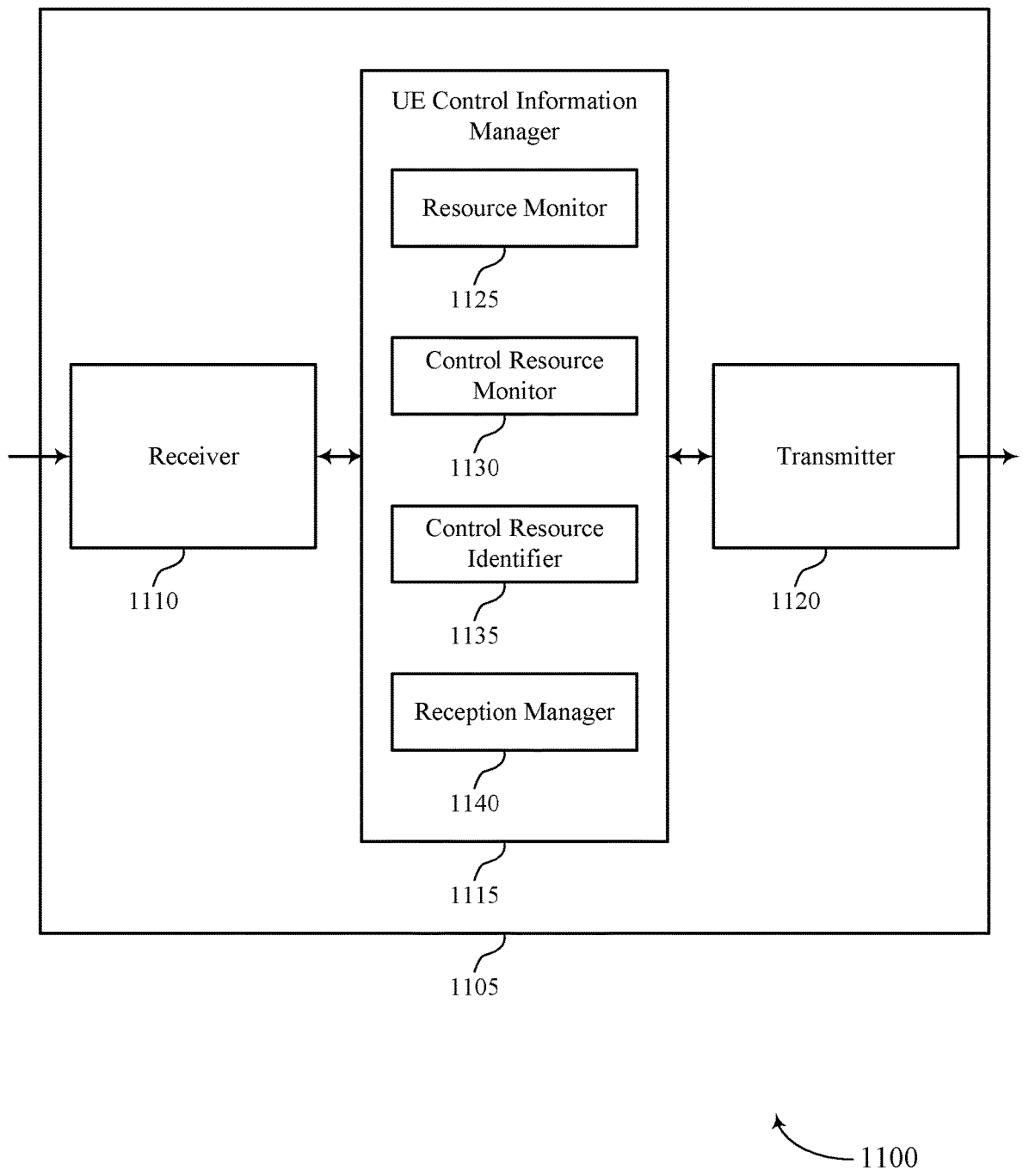

FIG. 11 shows a block diagram 1100 of a UE control information manager 1115 that supports multiplexing clustered control information and data in accordance with aspects of the present disclosure. The UE control information manager 1115 may be an example of aspects of a UE control information manager 1215 described with reference to FIG. 10. The UE control information manager 1115 may include resource monitor 1120, control resource monitor 1125, control resource identifier 1130, and reception manager 1135. Each of these modules may communicate, directly or indirectly, with one another (e.g., via one or more buses).

Resource monitor 1120 may receive, from a base station, a first indication of which of a clustered scheme or a distributed scheme is configured for control information transmissions. In some cases, the indication indicates that the clustered scheme is configured for control information transmissions, where the first time resources occur during a control information transmission cluster, and where the control information transmission cluster occurs before the second time resources. In some cases, the indication indicates that the distributed scheme is configured for control information transmissions. In some examples, the resource monitor 1120 may receive, from the base station, a second indication of a monitoring pattern for the control information transmission cluster. In some cases, the first indication and the second indication are received in a same control message. For example, the first indication may correspond to a first set of bits of a parameter in a control message and the second indication may correspond to a second set of bits of the parameter in the control message.

Resource monitor 1120 may receive, from a base station, an indication that control information for the UE is configured in a control information transmission cluster. Resource monitor 1120 may also receive, from the base station, an indication of a control information resource set, the control information resource set associated with a first frequency bandwidth, identify a preferred transmit beam direction of the base station based on one or more synchronization signals or one or more reference signals transmitted by the base station, where the portion of the control information transmission cluster corresponds to control information transmitted using the preferred transmit beam direction. Resource monitor 1120 may also receive the indication that control information for the UE is configured in a control information transmission cluster includes receiving the indication in a master information block (MIB), a SIB, RRC signaling, a medium access control (MAC) control element (CE), or DCI.

Control resource monitor 1125 may monitor, based on the indication, a control information resource set for control information for the UE. In some examples, the control resource monitor 1125 may identify a preferred transmit beam direction based on one or more synchronization signals transmitted by the base station, where a location of the control information resource set in the control information transmission cluster corresponds to the preferred transmit beam direction. In some examples, the control resource monitor 1125 may receive a mapping pattern between a beam pattern corresponding to a synchronization signal transmission and a control information beam pattern of the control information transmission cluster Control resource monitor 1125 may monitor the control information resource set for the control information for the UE for at least a portion of the control information transmission cluster. Control resource monitor 1125 may also receive, from the base station, an indication of a monitoring pattern for the UE for the control information transmission cluster, where the monitoring includes monitoring the control information resource set according to the monitoring pattern. Control resource monitor 1125 may also receive a mapping pattern between a beam pattern of the one or more synchronization signals or the one or more reference signals and a control information beam pattern of the control information transmission cluster. Control resource monitor 1125 may also identify the portion of the control information transmission cluster based on the beam pattern and the mapping pattern.

Control resource identifier 1130 may identify, during first time resources based on the monitoring, the control information for the UE, the control information scheduling a data transmission for the UE during second time resources. In some examples, the control resource identifier 1130 may identify the first time resources based on the beam pattern and the mapping pattern.

Control resource identifier 1130 may identify, during first time resources based on the monitoring, a downlink grant for the UE, the downlink grant scheduling a data transmission for the first UE during second time resources over a second frequency bandwidth. In some cases, the first frequency bandwidth is smaller than the second frequency bandwidth. In some cases, the first frequency bandwidth overlaps in frequency with the second frequency bandwidth. In some cases, the first frequency bandwidth is non-overlapping in frequency with the second frequency bandwidth.

Reception manager 1135 may receive the data transmission in the second time resources. In some cases, the data transmission may be received over the second frequency bandwidth based on the downlink grant, receive the downlink grant over the first frequency bandwidth. In some cases, reception manager 1135 may receive the control over a first frequency bandwidth and the data transmission is received over a second frequency bandwidth. In some cases, the first frequency bandwidth is smaller than the second frequency bandwidth. In some cases, the first frequency bandwidth is a same size as the second frequency bandwidth. In some cases, the first frequency bandwidth overlaps in frequency with the second frequency bandwidth. In some cases, the data transmission includes a SIB message, PDCCH followed by PDSCH, a random access response message (e.g., MSG 2), a paging message, or a user data block. Reception manager 1135 may also retune a receiver of the UE based on the scheduling and receive the data transmission over the second frequency bandwidth based on retuning the receiver, and indicate, to the base station, a delay associated with the retuning of the receiver.

Figure 12:
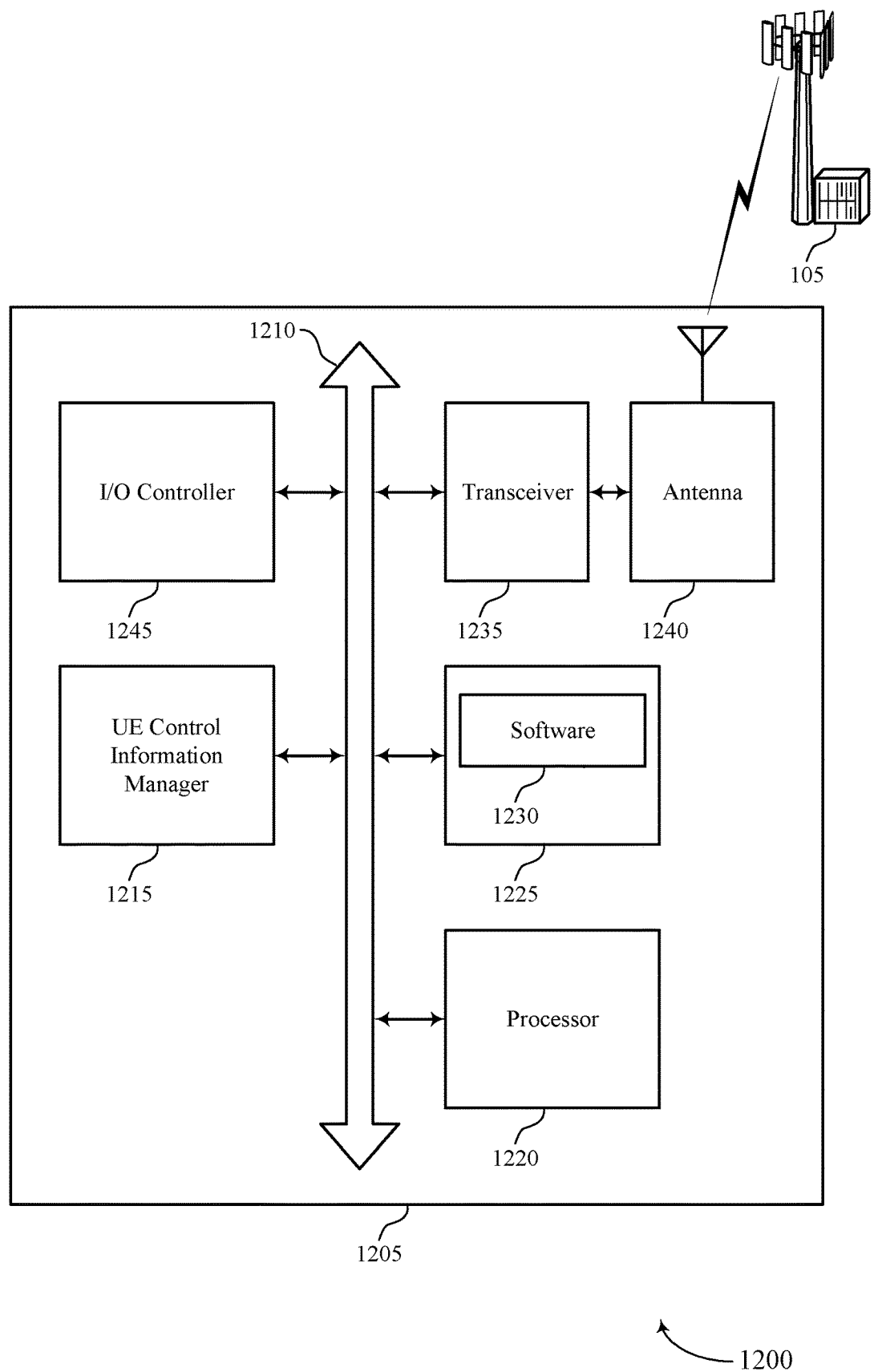
FIG. 12 illustrates a block diagram of a system including a UE that supports multiplexing clustered control information and data in accordance with aspects of the present disclosure.

FIG. 12 shows a diagram of a system 1200 including a device 1205 that supports multiplexing clustered control information and data in accordance with aspects of the present disclosure. Device 1205 may be an example of or include the components of UE 115 as described above, e.g., with reference to FIG. 1. Device 1205 may include components for bi-directional voice and data communications including components for transmitting and receiving communications, including UE control information manager 1215, processor 1220, memory 1225, software 1230, transceiver 1235, antenna 1240, and I/O controller 1245. These components may be in electronic communication via one or more buses (e.g., bus 1210). Device 1205 may communicate wirelessly with one or more base stations 105.

Processor 1220 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, processor 1220 may be configured to operate a memory array using a memory controller. In other cases, a memory controller may be integrated into processor 1220. Processor 1220 may be configured to execute computer-readable instructions stored in a memory to perform various functions (e.g., functions or tasks supporting multiplexing clustered control information and data).

Memory 1225 may include RAM and ROM. The memory 1225 may store computer-readable, computer-executable software 1230 including instructions that, when executed, cause the processor to perform various functions described herein. In some cases, the memory 1225 may contain, among other things, a BIOS which may control basic hardware or software operation such as the interaction with peripheral components or devices.

Software 1230 may include code to implement aspects of the present disclosure, including code to support multiplexing clustered control information and data. Software 1230 may be stored in a non-transitory computer-readable medium such as system memory or other memory. In some cases, the software 1230 may not be directly executable by the processor but may cause a computer (e.g., when compiled and executed) to perform functions described herein.

Transceiver 1235 may communicate bi-directionally, via one or more antennas, wired, or wireless links as described above. For example, the transceiver 1235 may represent a wireless transceiver and may communicate bi-directionally with another wireless transceiver. The transceiver 1235 may also include a modem to modulate the packets and provide the modulated packets to the antennas for transmission, and to demodulate packets received from the antennas.

In some cases, the wireless device may include a single antenna 1240. However, in some cases the device may have more than one antenna 1240, which may be capable of concurrently transmitting or receiving multiple wireless transmissions.

I/O controller 1245 may manage input and output signals for device 1205. I/O controller 1245 may also manage peripherals not integrated into device 1205. In some cases, I/O controller 1245 may represent a physical connection or port to an external peripheral. In some cases, I/O controller 1245 may utilize an operating system such as iOS®, ANDROID®, MS-DOS®, MS-WINDOWS®, OS/2®, UNIX®, LINUX®, or another known operating system. In other cases, I/O controller 1245 may represent or interact with a modem, a keyboard, a mouse, a touchscreen, or a similar device. In some cases, I/O controller 1245 may be implemented as part of a processor. In some cases, a user may interact with device 1205 via I/O controller 1245 or via hardware components controlled by I/O controller 1245.

Figure 13:
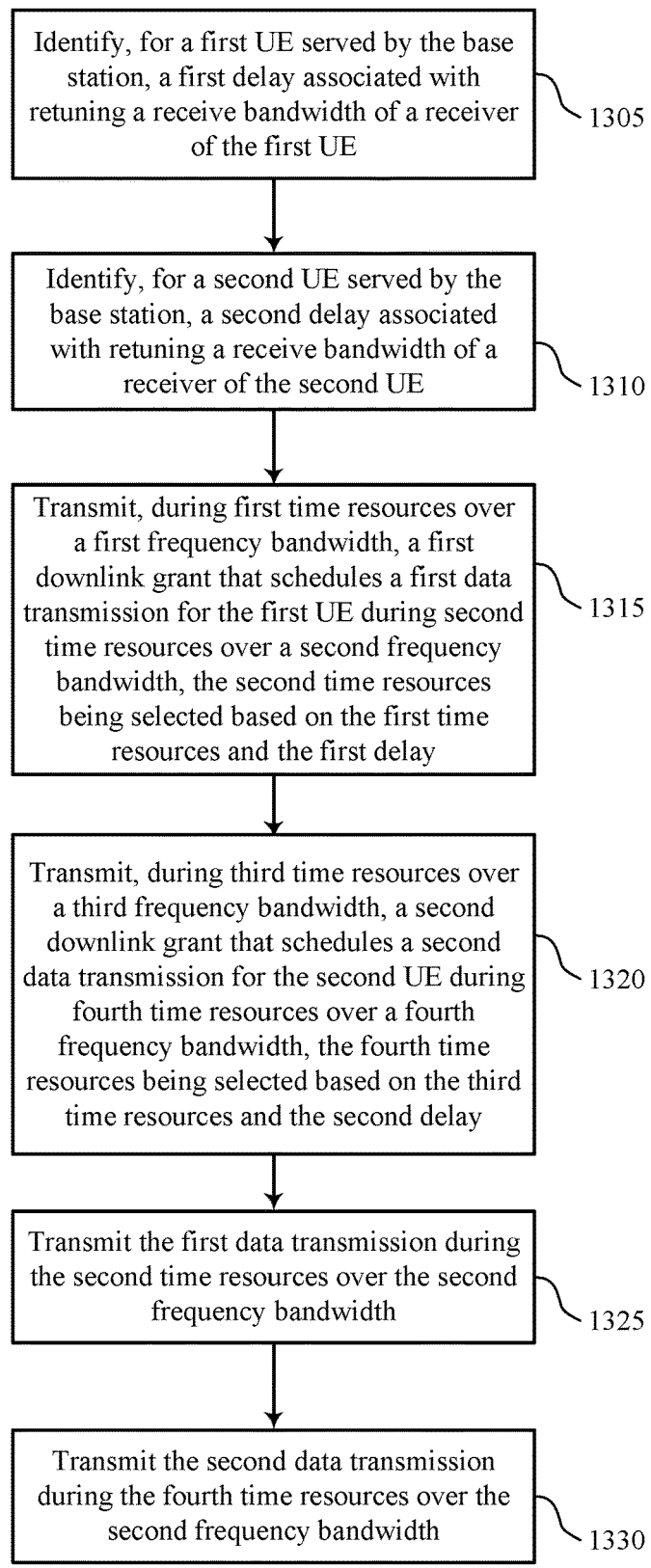
FIGS. 13 through 16 illustrate methods for multiplexing clustered control information and data in accordance with aspects of the present disclosure.

FIG. 13 shows a flowchart illustrating a method 1300 for multiplexing clustered control information and data in accordance with aspects of the present disclosure. The operations of method 1300 may be implemented by a base station 105 or its components as described herein. For example, the operations of method 1300 may be performed by a base station control information manager as described with reference to FIGS. 7 through 9. In some examples, a base station 105 may execute a set of codes to control the functional elements of the device to perform the functions described below. Additionally or alternatively, the base station 105 may perform aspects of the functions described below using special-purpose hardware.

At block 1305 the base station 105 may identify, for a first user equipment (UE) served by the base station, a first delay associated with retuning a receive bandwidth of a receiver of the first UE. The operations of block 1305 may be performed according to the methods described herein. In certain examples, aspects of the operations of block 1305 may be performed by a control information scheduler as described with reference to FIGS. 7 through 9.

At block 1310 the base station 105 may identify, for a second UE served by the base station, a second delay associated with retuning a receive bandwidth of a receiver of the second UE. The operations of block 1310 may be performed according to the methods described herein. In certain examples, aspects of the operations of block 1310 may be performed by a control information scheduler as described with reference to FIGS. 7 through 9.

At block 1315 the base station 105 may transmit, during first time resources over a first frequency bandwidth, a first downlink grant that schedules a first data transmission for the first UE during second time resources over a second frequency bandwidth, the second time resources being selected based at least in part on the first time resources and the first delay. The operations of block 1315 may be performed according to the methods described herein. In certain examples, aspects of the operations of block 1315 may be performed by a control transmission manager as described with reference to FIGS. 7 through 9.

At block 1320 the base station 105 may transmit, during third time resources over a third frequency bandwidth, a second downlink grant that schedules a second data transmission for the second UE during fourth time resources over a fourth frequency bandwidth, the fourth time resources being selected based at least in part on the third time resources and the second delay. The operations of block 1320 may be performed according to the methods described herein. In certain examples, aspects of the operations of block 1320 may be performed by a control transmission manager as described with reference to FIGS. 7 through 9.

At block 1325 the base station 105 may transmit the first data transmission during the second time resources over the second frequency bandwidth. The operations of block 1325 may be performed according to the methods described herein. In certain examples, aspects of the operations of block 1325 may be performed by a data transmission manager as described with reference to FIGS. 7 through 9.

At block 1330 the base station 105 may transmit the second data transmission during the fourth time resources over the second frequency bandwidth. The operations of block 1330 may be performed according to the methods described herein. In certain examples, aspects of the operations of block 1330 may be performed by a data transmission manager as described with reference to FIGS. 7 through 9.

Figure 14:
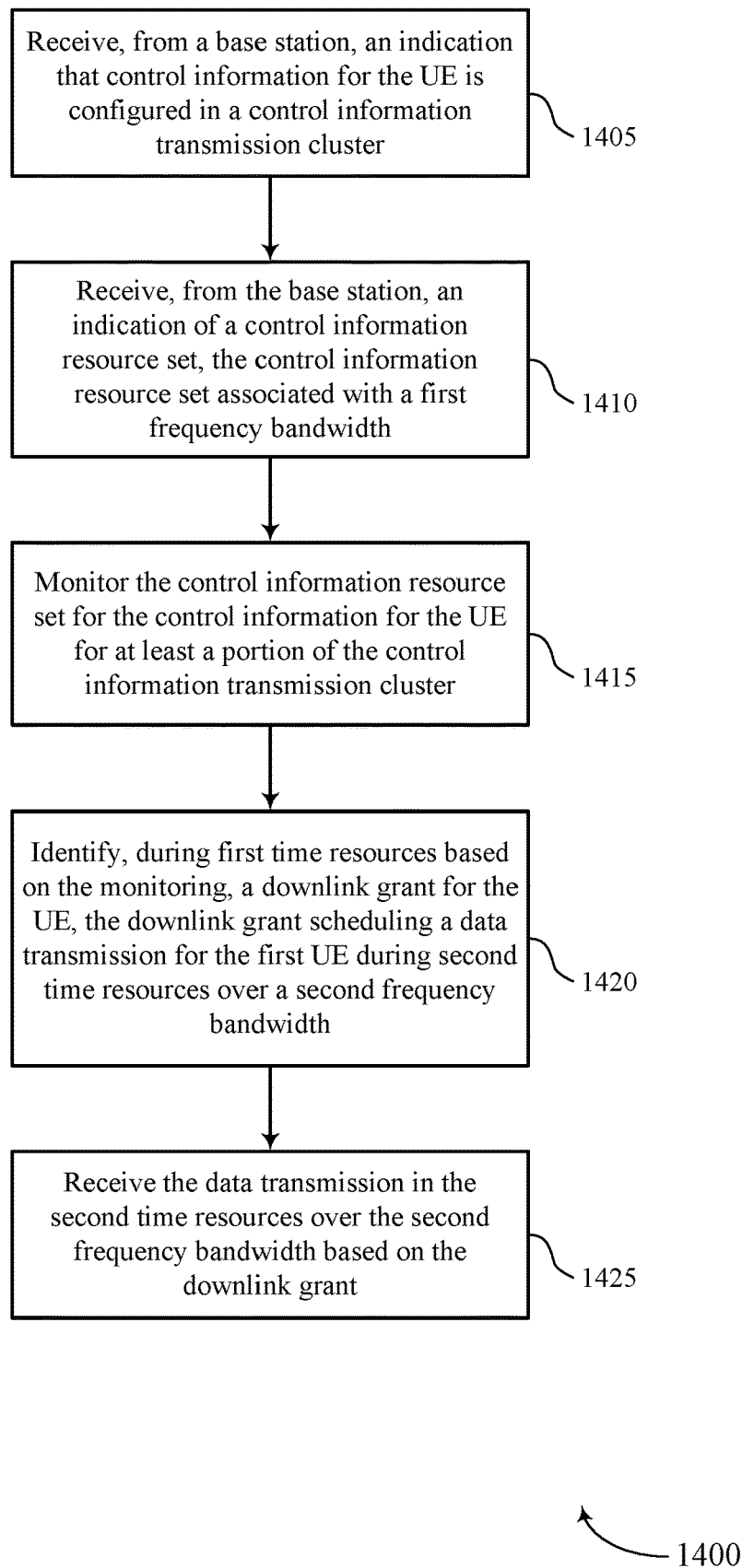

FIG. 14 shows a flowchart illustrating a method 1400 for multiplexing clustered control information and data in accordance with aspects of the present disclosure. The operations of method 1400 may be implemented by a UE 115 or its components as described herein. For example, the operations of method 1400 may be performed by a UE control information manager as described with reference to FIGS. 10 through 12. In some examples, a UE 115 may execute a set of codes to control the functional elements of the device to perform the functions described below. Additionally or alternatively, the UE 115 may perform aspects of the functions described below using special-purpose hardware.

At block 1405 the UE 115 may receive, from a base station, an indication that control information for the UE is configured in a control information transmission cluster. The operations of block 1405 may be performed according to the methods described herein. In certain examples, aspects of the operations of block 1405 may be performed by a resource monitor as described with reference to FIGS. 10 through 12.

At block 1410 the UE 115 may receive, from the base station, an indication of a control information resource set, the control information resource set associated with a first frequency bandwidth. The operations of block 1410 may be performed according to the methods described herein. In certain examples, aspects of the operations of block 1410 may be performed by a resource monitor as described with reference to FIGS. 10 through 12.

At block 1415 the UE 115 may monitor the control information resource set for the control information for the UE for at least a portion of the control information transmission cluster. The operations of block 1415 may be performed according to the methods described herein. In certain examples, aspects of the operations of block 1415 may be performed by a control resource monitor as described with reference to FIGS. 10 through 12.

At block 1420 the UE 115 may identify, during first time resources based on the monitoring, a downlink grant for the UE, the downlink grant scheduling a data transmission for the first UE during second time resources over a second frequency bandwidth. The operations of block 1420 may be performed according to the methods described herein. In certain examples, aspects of the operations of block 1420 may be performed by a control resource identifier as described with reference to FIGS. 10 through 12.

At block 1425 the UE 115 may receive the data transmission in the second time resources over the second frequency bandwidth based at least in part on the downlink grant. The operations of block 1425 may be performed according to the methods described herein. In certain examples, aspects of the operations of block 1425 may be performed by a reception manager as described with reference to FIGS. 10 through 12.

Figure 15:
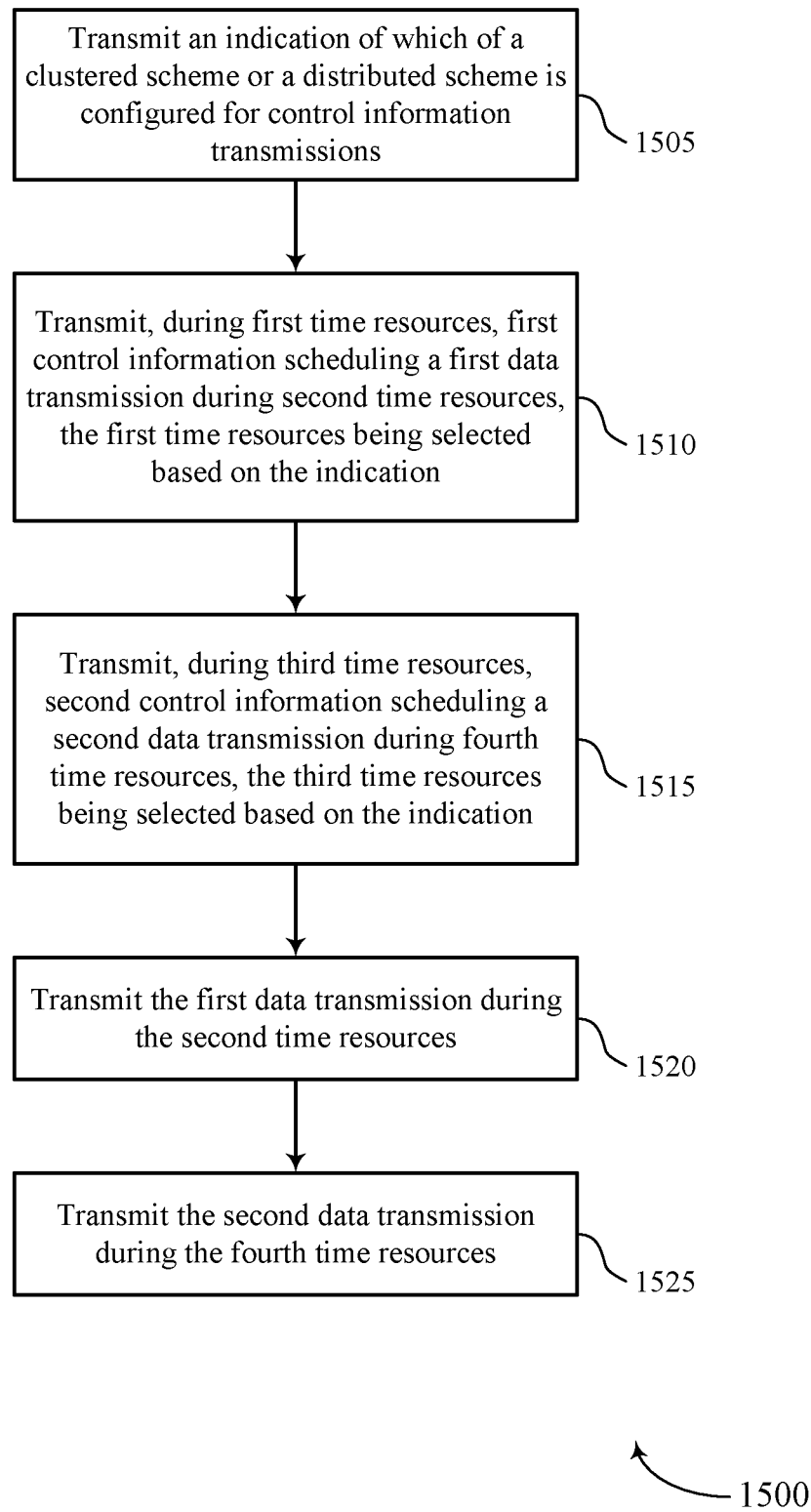

FIG. 15 shows a flowchart illustrating a method 1500 that supports multiplexing clustered control information and data in accordance with aspects of the present disclosure. The operations of method 1500 may be implemented by a base station 105 or its components as described herein. For example, the operations of method 1500 may be performed by a communications manager as described with reference to FIGS. 7 to 9. In some examples, a base station may execute a set of instructions to control the functional elements of the base station to perform the functions described below. Additionally or alternatively, a base station may perform aspects of the functions described below using special-purpose hardware.

At 1505, the base station may transmit an indication of which of a clustered scheme or a distributed scheme is configured for control information transmissions. The operations of 1505 may be performed according to the methods described herein. In some examples, aspects of the operations of 1505 may be performed by a control information scheduler as described with reference to FIGS. 7 to 9.

At 1510, the base station may transmit, during first time resources, first control information scheduling a first data transmission during second time resources, the first time resources being selected based on the indication. The operations of 1510 may be performed according to the methods described herein. In some examples, aspects of the operations of 1510 may be performed by a control transmission manager as described with reference to FIGS. 7 to 9.

At 1515, the base station may transmit, during third time resources, second control information scheduling a second data transmission during fourth time resources, the third time resources being selected based on the indication. The operations of 1515 may be performed according to the methods described herein. In some examples, aspects of the operations of 1515 may be performed by a control transmission manager as described with reference to FIGS. 7 to 9.

At 1520, the base station may transmit the first data transmission during the second time resources. The operations of 1520 may be performed according to the methods described herein. In some examples, aspects of the operations of 1520 may be performed by a data transmission manager as described with reference to FIGS. 7 to 9.

At 1525, the base station may transmit the second data transmission during the fourth time resources. The operations of 1525 may be performed according to the methods described herein. In some examples, aspects of the operations of 1525 may be performed by a data transmission manager as described with reference to FIGS. 7 to 9.

Figure 16:
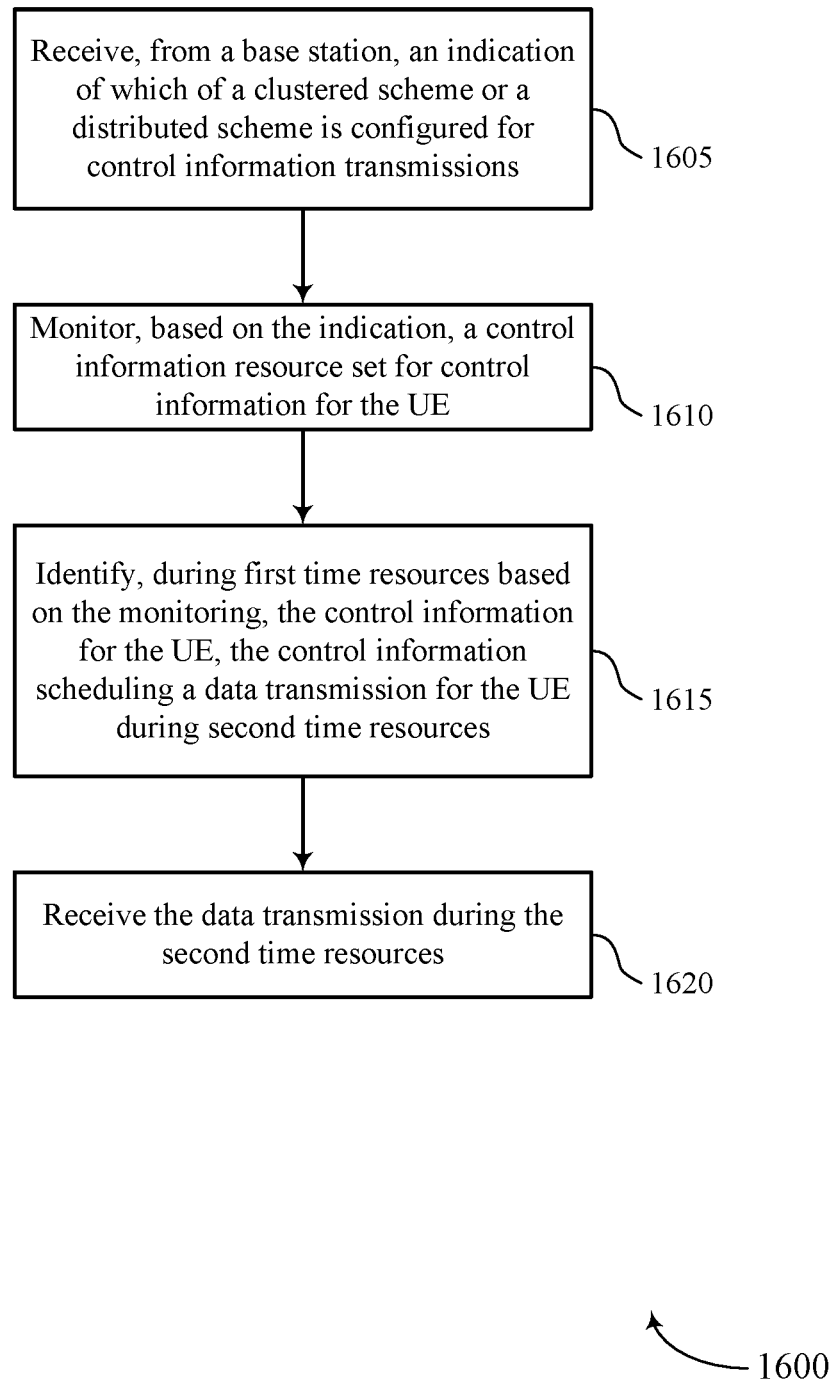

FIG. 16 shows a flowchart illustrating a method 1600 that supports multiplexing clustered control information and data in accordance with aspects of the present disclosure. The operations of method 1600 may be implemented by a UE 115 or its components as described herein. For example, the operations of method 1600 may be performed by a communications manager as described with reference to FIGS. 10 to 12. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, an indication of which of a clustered scheme or a distributed scheme is configured for control information transmissions. The operations of 1605 may be performed according to the methods described herein. In some examples, aspects of the operations of 1605 may be performed by a resource monitor as described with reference to FIGS. 10 to 12.

At 1610, the UE may monitor, based on the indication, a control information resource set for control information for the UE. The operations of 1610 may be performed according to the methods described herein. In some examples, aspects of the operations of 1610 may be performed by a control resource monitor as described with reference to FIGS. 10 to 12.

At 1615, the UE may identify, during first time resources based on the monitoring, the control information for the UE, the control information scheduling a data transmission for the UE during second time resources. The operations of 1615 may be performed according to the methods described herein. In some examples, aspects of the operations of 1615 may be performed by a control resource identifier as described with reference to FIGS. 10 to 12.

At 1620, the UE may receive the data transmission during the second time resources. The operations of 1620 may be performed according to the methods described herein. In some examples, aspects of the operations of 1620 may be performed by a reception manager as described with reference to FIGS. 10 to 12.

It should be noted that the methods described above describe possible implementations, and that the operations and the steps may be rearranged or otherwise modified and that other implementations are possible. Furthermore, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. The terms "system" and "network" are often used interchangeably. A code division multiple access (CDMA) system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE and LTE-A are releases of UMTS that use E-UTRA. UTRA, E-UTRA, UMTS, LTE, LTE-A, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE or an NR system may be described for purposes of example, and LTE or NR terminology may be used in much of the description, the techniques described herein are applicable beyond LTE or NR applications.

In LTE/LTE-A networks, including such networks described herein, the term evolved node B (eNB) may be generally used to describe the base stations. The wireless communications system or systems described herein may include a heterogeneous LTE/LTE-A or NR network in which different types of eNBs provide coverage for various geographical regions. For example, each eNB, next generation NodeB (gNB), or base station may provide communication coverage for a macro cell, a small cell, or other types of cell. The term "cell" may be used to describe a base station, a carrier or component carrier associated with a base station, or a coverage area (e.g., sector, etc.) of a carrier or base station, depending on context.

Base stations may include or may be referred to by those skilled in the art as a base transceiver station, a radio base station, an access point, a radio transceiver, a NodeB, eNodeB (eNB), gNB, Home NodeB, a Home eNodeB, or some other suitable terminology. The geographic coverage area for a base station may be divided into sectors making up only a portion of the coverage area. The wireless communications system or systems described herein may include base stations of different types (e.g., macro or small cell base stations). The UEs described herein may be able to communicate with various types of base stations and network equipment including macro eNBs, small cell eNBs, gNBs, relay base stations, and the like. There may be overlapping geographic coverage areas for different technologies.

A macro cell generally covers a relatively large geographic area (e.g., several kilometers in radius) and may allow unrestricted access by UEs with service subscriptions with the network provider. A small cell is a lower-powered base station, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., component carriers).

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The downlink transmissions described herein may also be called forward link transmissions while the uplink transmissions may also be called reverse link transmissions. Each communication link described herein—including, for example, wireless communications system 100 and wireless communications subsystem 200 of FIGS. 1 and 2—may include one or more carriers, where each carrier may be a signal made up of multiple sub-carriers (e.g., waveform signals of different frequencies).

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a base station, comprising:
   transmitting an indication of which of a clustered scheme or a distributed scheme is configured for control information transmissions;
   transmitting, during first time resources and over a first frequency bandwidth, first control information scheduling a first data transmission during second time resources and over a second frequency bandwidth, the first time resources being selected based at least in part on the indication;
   transmitting, during third time resources and over a third frequency bandwidth, second control information scheduling a second data transmission during fourth time resources and over a fourth frequency bandwidth, the third time resources being selected based at least in part on the indication;
   transmitting the first data transmission during the second time resources; and
   transmitting the second data transmission during the fourth time resources.

2. The method of claim 1, wherein the indication indicates that the clustered scheme is configured for control information transmissions, and wherein the first control information and the second control information are transmitted in a control information transmission cluster.

3. The method of claim 2, wherein the first control information is transmitted in a first beam direction and the second control information is transmitted in a second beam direction.

4. The method of claim 3, further comprising:
transmitting a mapping pattern between a beam pattern corresponding to a synchronization signal transmission and a control information beam pattern of the control information transmission cluster.

5. The method of claim 2, further comprising:
indicating a monitoring pattern for the control information transmission cluster.

6. The method of claim 2, wherein the second time resources and the fourth time resources occur after the first time resources and the third time resources.

7. The method of claim 2, wherein the second time resources occur after the first time resources, wherein the third time resources occur before the second time resources, and wherein the fourth time resources occur after the second time resources.

8. The method of claim 1, wherein the indication indicates that the distributed scheme is configured for control information transmissions.

9. The method of claim 1, wherein the indication is transmitted in a master information block (MIB).

10. The method of claim 1, wherein the first frequency bandwidth is smaller than the second frequency bandwidth, and wherein the third frequency bandwidth is smaller than the fourth frequency bandwidth.

11. The method of claim 1, wherein the first frequency bandwidth is a same size as the second frequency bandwidth, and wherein the third frequency bandwidth is a same size as the fourth frequency bandwidth.

12. The method of claim 1, wherein the first frequency bandwidth is non-overlapping in frequency with the second frequency bandwidth, and wherein the third frequency bandwidth is non-overlapping with the fourth frequency bandwidth.

13. The method of claim 1, wherein the first data transmission or the second data transmission comprises a system information block (SIB) message, a random access response message, a paging message, or a user data block.

14. A method for wireless communications at a user equipment (UE), comprising:
receiving, from a base station, an indication of which of a clustered scheme or a distributed scheme is configured for control information transmissions;
monitoring, based at least in part on the indication, a control information resource set for control information for the UE;
receiving, during first time resources and over a first frequency bandwidth, the control information for the UE based at least in part on the monitoring, the control information scheduling a data transmission for the UE during second time resources; and
receiving the data transmission during the second time resources and over a second frequency bandwidth.

15. The method of claim 14, wherein the indication indicates that the clustered scheme is configured for control information transmissions, wherein the first time resources occur during a control information transmission cluster, and wherein the control information transmission cluster occurs before the second time resources.

16. The method of claim 15, further comprising:
receiving, from the base station, an indication of a monitoring pattern for the control information transmission cluster.

17. The method of claim 15, further comprising:
identifying a preferred transmit beam direction based at least in part on one or more synchronization signals transmitted by the base station, wherein a location of the control information resource set in the control information transmission cluster corresponds to the preferred transmit beam direction.

18. The method of claim 15, further comprising:
receiving a mapping pattern between a beam pattern corresponding to a synchronization signal transmission and a control information beam pattern of the control information transmission cluster; and
identifying the first time resources based at least in part on the beam pattern and the mapping pattern.

19. The method of claim 15, wherein third time resources occur during the control information transmission cluster and after the first time resources.

20. The method of claim 14, wherein the indication indicates that the distributed scheme is configured for control information transmissions.

21. The method of claim 14, wherein the indication is received in a master information block (MIB), a system information block (SIB), radio resource control (RRC) signaling, a medium access control (MAC) control element (CE), or downlink control information (DCI).

22. The method of claim 14, wherein the first frequency bandwidth is smaller than the second frequency bandwidth.

23. The method of claim 14, wherein the first frequency bandwidth is a same size as the second frequency bandwidth.

24. The method of claim 14, wherein the first frequency bandwidth overlaps in frequency with the second frequency bandwidth.

25. The method of claim 14, wherein the data transmission comprises a system information block (SIB) message, a random access response message, a paging message, or a user data block.

26. An apparatus for wireless communications at a base station, comprising:
a processor,
memory in electronic communication with the processor; and
instructions stored in the memory and executable by the processor to cause the apparatus to:
transmit an indication of which of a clustered scheme or a distributed scheme is configured for control information transmissions;
transmit, during first time resources and over a first frequency bandwidth, first control information scheduling a first data transmission during second time resources and over a second frequency bandwidth, the first time resources being selected based at least in part on the indication;
transmit, during third time resources and over a third frequency bandwidth, second control information scheduling a second data transmission during fourth time resources and over a fourth frequency bandwidth, the third time resources being selected at least in part on the indication;
transmit the first data transmission during the second time resources; and
transmit the second data transmission during the fourth time resources.

27. The apparatus of claim 26, wherein the indication indicates that the clustered scheme is configured for control information transmissions, and wherein the first control information and the second control information are transmitted in a control information transmission cluster.

28. The apparatus of claim 27, wherein the first control information is transmitted in a first beam direction and the second control information is transmitted in a second beam direction.

29. The apparatus of claim 28, wherein the instructions are further executable by the processor to cause the apparatus to:
transmit a mapping pattern between a beam pattern corresponding to a synchronization signal transmission and a control information beam pattern of the control information transmission cluster.

30. The apparatus of claim 27, wherein the instructions are further executable by the processor to cause the apparatus to:
indicate a monitoring pattern for the control information transmission cluster.

31. The apparatus of claim 27, wherein the second time resources occur after the first time resources, wherein the third time resources occur before the second time resources, and wherein the fourth time resources occur after the second time resources.

32. The apparatus of claim 26, wherein the indication indicates that the distributed scheme is configured for control information transmissions.

33. The apparatus of claim 26, wherein the indication is transmitted in a master information block (MIB).

34. The apparatus of claim 26, wherein the first data transmission or the second data transmission comprises a system information block (SIB) message, a random access response message, a paging message, or a user data block.

35. The apparatus of claim 26, wherein:
the first frequency bandwidth is smaller than the second frequency bandwidth and the third frequency bandwidth is smaller than the fourth frequency bandwidth, or
the first frequency bandwidth is a same size as the second frequency bandwidth and the third frequency bandwidth is a same size as the fourth frequency bandwidth, or
the first frequency bandwidth is non-overlapping in frequency with the second frequency bandwidth and the third frequency bandwidth is non-overlapping with the fourth frequency bandwidth.

36. An apparatus for wireless communications at a user equipment (UE), comprising:
a processor,
memory in electronic communication with the processor; and
instructions stored in the memory and executable by the processor to cause the apparatus to:
receive, from a base station, an indication of which of a clustered scheme or a distributed scheme is configured for control information transmissions;
monitor, based at least in part on the indication, a control information resource set for control information for the UE;
receive, during first time resources and over a first frequency bandwidth, the control information for the UE based at least in part on the monitoring, the control information scheduling a data transmission for the UE during second time resources; and
receive the data transmission during the second time resources and over a second frequency bandwidth.

37. The apparatus of claim 36, wherein the indication indicates that the clustered scheme is configured for control information transmissions, wherein the first time resources occur during a control information transmission cluster, and wherein the control information transmission cluster occurs before the second time resources.

38. The apparatus of claim 37, wherein the instructions are further executable by the processor to cause the apparatus to:
receive, from the base station, an indication of a monitoring pattern for the control information transmission cluster.

39. The apparatus of claim 37, wherein the instructions are further executable by the processor to cause the apparatus to:
identify a preferred transmit beam direction based at least in part on one or more synchronization signals transmitted by the base station, wherein a location of the control information resource set in the control information transmission cluster corresponds to the preferred transmit beam direction.

40. The apparatus of claim 37, wherein the instructions are further executable by the processor to cause the apparatus to:
receive a mapping pattern between a beam pattern corresponding to a synchronization signal transmission and a control information beam pattern of the control information transmission cluster; and
identify the first time resources based at least in part on the beam pattern and the mapping pattern.

41. The apparatus of claim 36, wherein the indication indicates that the distributed scheme is configured for control information transmissions.

42. The apparatus of claim 36, wherein:
the indication is received in a master information block (MIB), a system information block (SIB), radio resource control (RRC) signaling, a medium access control (MAC) control element (CE), or downlink control information (DCI), or
the data transmission comprises a system information block (SIB) message, a random access response message, a paging message, or a user data block.

43. The apparatus of claim 36, wherein:
the first frequency bandwidth is smaller than the second frequency bandwidth, or
the first frequency bandwidth is a same size as the second frequency bandwidth, or
the first frequency bandwidth overlaps in frequency with the second frequency bandwidth.

\* \* \* \* \*